United States Patent
Barbu et al.

(10) Patent No.: US 12,477,489 B2
(45) Date of Patent: Nov. 18, 2025

(54) METHODS AND APPARATUSES RELATING TO WIRELESS COMMUNICATION

(71) Applicant: Nokia Technologies Oy, Espoo (FI)

(72) Inventors: Oana-Elena Barbu, Aalborg (DK); Diomidis Michalopoulos, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 261 days.

(21) Appl. No.: 18/207,381

(22) Filed: Jun. 8, 2023

(65) Prior Publication Data

US 2023/0413201 A1    Dec. 21, 2023

(30) Foreign Application Priority Data

Jun. 10, 2022 (EP) .................................. 22178386

(51) Int. Cl.
*H04W 56/00* (2009.01)
*H04B 17/318* (2015.01)

(52) U.S. Cl.
CPC ...... *H04W 56/0015* (2013.01); *H04B 17/328* (2023.05)

(58) Field of Classification Search
CPC ............. H04W 56/0015; H04B 17/328; G01S 13/003; G01S 13/878; G01S 2013/462; G01S 13/42; G01S 13/46
See application file for complete search history.

(56) References Cited

U.S. PATENT DOCUMENTS

| | | | |
|---|---|---|---|
| 2020/0267681 A1* | 8/2020 | Ferrari | H04W 64/00 |
| 2021/0160712 A1 | 5/2021 | Tadayon et al. | |

(Continued)

FOREIGN PATENT DOCUMENTS

| | | |
|---|---|---|
| WO | WO 2018/031971 A1 | 2/2018 |
| WO | WO 2020/028517 A1 | 2/2020 |

OTHER PUBLICATIONS

EESR (22178386.3) Oct. 14, 2022, 10 pgs.

(Continued)

*Primary Examiner* — Walli Z Butt
(74) *Attorney, Agent, or Firm* — Lippes Mathias LLP

(57) ABSTRACT

This specification describes an apparatus comprising: means for receiving, at a target user equipment, UE, a signal including information indicative of supporting UE measurements of signals transmitted from the target UE to a supporting UE via a multipath communications channel, the supporting UE measurements including delay and angle measurements of the signals transmitted from the target UE to the supporting UE via the multipath communications channel; means for time-aligning the supporting UE measurements with target UE measurements of signals transmitted from the supporting UE to the target UE via the multipath communications channel, the target UE measurements including delay and angle measurements for the signals transmitted from the supporting UE to the target UE via the multipath communications channel; means for determining, based on the time-aligned measurements, an association between a component of the target UE measurements and at least one respective component of the supporting UE measurements, wherein the associated components are determined to correspond to a particular reflector in an environment of the target UE; and means for determining, based on the associated components, location information for the particular reflector.

20 Claims, 13 Drawing Sheets

(56) References Cited

U.S. PATENT DOCUMENTS

| | | |
|---|---|---|
| 2021/0250118 A1 | 8/2021 | Roth-Mandutz et al. |
| 2021/0389407 A1* | 12/2021 | Park .................. G01S 5/011 |
| 2022/0078581 A1 | 3/2022 | Choi et al. |
| 2022/0229143 A1* | 7/2022 | Dwivedi .............. G01S 5/0273 |

OTHER PUBLICATIONS

Futurewei: "Considerations on potential solutions for SL positioning", R1-2203058, 3GPP TSG RAN WG1 Meeting #109-e, May 9-20, 2022; XP52152846A, 9 pages.

\* cited by examiner

```
┌─────────────────────────────────────────┐
│ receiving, at a target user equipment, UE, a signal      │
│ including information indicative of supporting UE        │
│ measurements of signals transmitted from the target      │
│ UE to a supporting UE via a multipath                    │  S10.1
│ communications channel, the supporting UE                │
│ measurements including delay and angle                   │
│ measurements of the signals transmitted from the         │
│ target UE to the supporting UE via the multipath         │
│ communications channel                                    │
└─────────────────────────────────────────┘
                         ▼
┌─────────────────────────────────────────┐
│ time-aligning the supporting UE measurements with        │
│ target UE measurements of signals transmitted from       │
│ the supporting UE to the target UE via the multipath     │
│ communications channel, the target UE                    │  S10.2
│ measurements including delay and angle                   │
│ measurements for the signals transmitted from the        │
│ supporting UE to the target UE via the multipath         │
│ communications channel                                    │
└─────────────────────────────────────────┘
                         ▼
┌─────────────────────────────────────────┐
│ determining, based on the time-aligned                   │
│ measurements, an association between a                   │
│ component of the target UE measurements and at           │
│ least one respective component of the supporting         │  S10.3
│ UE measurements, wherein the associated                  │
│ components are determined to correspond to a             │
│ particular reflector in an environment of the target     │
│ UE                                                       │
└─────────────────────────────────────────┘
                         ▼
┌─────────────────────────────────────────┐
│ determining, based on the associated components,         │  S10.4
│ location information for the particular reflector        │
└─────────────────────────────────────────┘
```

FIG. 10

```
┌─────────────────────────────────────────────┐
│ receiving, at a first terminal device and from a │
│ second terminal device, alignment information for │
│ use by the first terminal device in orienting a local │
│ coordinate system, LCS, of the first terminal device │  S12.1
│ to correspond in orientation to an LCS of the second │
│ terminal device │
└─────────────────────────────────────────────┘
                        ▼
┌─ ─ ─ ─ ─ ─ ─ ─ ─ ─ ─ ─ ─ ─ ─ ─ ─ ─ ─ ─ ─ ─ ─┐
│ orienting the local coordinate system, LCS, of the │
│ first terminal device to correspond in orientation to │  S12.2
│ the LCS of the second terminal device based on the │
│ received alignment information │
└─ ─ ─ ─ ─ ─ ─ ─ ─ ─ ─ ─ ─ ─ ─ ─ ─ ─ ─ ─ ─ ─ ─┘
                        ▼
┌─ ─ ─ ─ ─ ─ ─ ─ ─ ─ ─ ─ ─ ─ ─ ─ ─ ─ ─ ─ ─ ─ ─┐
│ determining, using the oriented LCS of the first │
│ terminal device, angle of arrival measurements of │
│ sidelink signals transmitted from the second │
│ terminal device to the first terminal device via a │  S12.3
│ multipath communications channel for use in │
│ determining location information of at least one │
│ reflector in an environment of the first and second │
│ terminal devices │
└─ ─ ─ ─ ─ ─ ─ ─ ─ ─ ─ ─ ─ ─ ─ ─ ─ ─ ─ ─ ─ ─ ─┘
                        ▼
┌─ ─ ─ ─ ─ ─ ─ ─ ─ ─ ─ ─ ─ ─ ─ ─ ─ ─ ─ ─ ─ ─ ─┐
│ transmitting, to the second terminal device, │
│ information indicative of the determined angle of │  S12.4
│ arrival measurements for use in determining │
│ location information of the at least one reflector │
└─ ─ ─ ─ ─ ─ ─ ─ ─ ─ ─ ─ ─ ─ ─ ─ ─ ─ ─ ─ ─ ─ ─┘
```

FIG. 12

METHODS AND APPARATUSES RELATING TO WIRELESS COMMUNICATION

FIELD

This specification relates generally to wireless communication.

BACKGROUND

User equipment (UE) devices can communicate wirelessly with other UE devices. Such communication is sometimes referred to as sidelink (SL) or device-to-device (D2D) communication and may facilitate a variety of tasks.

SUMMARY

In a first aspect, this specification describes an apparatus comprising means for receiving, at a target user equipment, UE, a signal including information indicative of supporting UE measurements of signals transmitted from the target UE to a supporting UE via a multipath communications channel, the supporting UE measurements including delay and angle measurements of the signals transmitted from the target UE to the supporting UE via the multipath communications channel; means for time-aligning the supporting UE measurements with target UE measurements of signals transmitted from the supporting UE to the target UE via the multipath communications channel, the target UE measurements including delay and angle measurements for the signals transmitted from the supporting UE to the target UE via the multipath communications channel; means for determining, based on the time-aligned measurements, an association between a component of the target UE measurements and at least one respective component of the supporting UE measurements, wherein the associated components are determined to correspond to a particular reflector in an environment of the target UE; and means for determining, based on the associated components, location information for the particular reflector.

In some examples, time-aligning the supporting UE measurements with the target UE measurements may comprise determining a common delay-domain origin based on an Rx-Tx time difference of the target UE, an Rx-Tx time difference of the supporting UE, a shortest delay of the supporting UE measurements and a shortest delay of the target UE measurements.

In some examples, the supporting UE measurements may further include power measurements of the signals transmitted from the target UE to the supporting UE via the multipath communications channel, and the target UE measurements may further include power measurements for the signals transmitted from the supporting UE to the target UE via the multipath communications channel. In some such examples, the target UE measurements and/or the supporting UE measurements may be resampled in the delay domain such that the target UE measurements and the supporting UE measurements have a common delay resolution, and the association may be determined based on the resampled measurements. In some such examples, the target UE power measurements and the supporting UE power measurements may be pruned and/or normalised prior to the resampling. In addition or alternatively, in some examples, the resampling may be based on a target channel response generated based on the target UE measurements and/or a supporting channel response generated based on the supporting UE measurements. In some such examples, the resampling may comprise convolving the target channel response and/or the supporting channel response with a filter having the common delay resolution. In addition or alternatively, in some examples, the resampling may comprise applying, to the target channel response and/or the supporting channel response, a discrete Fourier transform, DFT, followed by an inverse discrete Fourier transform, IDFT, wherein the IDFT has the common delay resolution.

In some examples, the at least one respective component of the supporting UE measurements may be determined to be associated with the component of the target UE measurements based on a minimisation of a divergence metric between the component of the target UE measurements and the at least one respective component of the supporting UE measurements. In some examples, the apparatus may further comprise means for aligning a coordinate system of the target UE with a coordinate system of the supporting UE based on a common reference direction. In some examples, the at least one respective component of the supporting UE measurements may be determined to be associated with the component of the target UE measurements based on either: a delay measurement of the at least one respective component of the supporting UE measurements being within a threshold delay of a delay measurement of the component of the target UE measurements; and/or a power measurement of the at least one respective component of the supporting UE measurements being within a threshold power of a power measurement of the component of the target UE measurements.

In some examples, the location information for the particular reflector may include at least one of: a distance and/or angle from the target UE to the particular reflector; a distance and/or angle from the supporting UE to the particular reflector; a distance and/or angle from a neighbouring UE to the particular reflector; a position of the particular reflector with respect to a local coordinate system, LCS, of the target UE, the supporting UE, and/or a neighbouring UE; and/or a position of the particular reflector with respect to a global coordinate system, GCS. In some examples, the apparatus may further comprise means for determining a position of the particular reflector relative to the target UE based on the determined location information.

In some examples, the apparatus may further comprise: means for receiving, at a target user equipment, UE, a signal including information indicative of additional supporting UE measurements of signals transmitted from the target UE to an additional supporting UE via an additional multipath communications channel, the additional supporting UE measurements including delay and angle measurements of the signals transmitted from the target UE to the additional supporting UE via the additional multipath communications channel; means for time-aligning the additional supporting UE measurements with additional target UE measurements of signals transmitted from the additional supporting UE to the target UE via the additional multipath communications channel, the additional target UE measurements including delay and angle measurements for the signals transmitted from the additional supporting UE to the target UE via the additional multipath communications channel; and means for determining, based on the additional time-aligned measurements, an additional association between a component of the additional target UE measurements and at least one respective component of the additional supporting UE measurements, wherein the additionally associated components may be determined to correspond to the particular reflector, and the determination of the location information for the particular reflector may be further based on the additionally associated components. In some such examples, the location information for the particular reflector may be determined based on an average of location information determined based on the associated components and location information determined based on the additionally associated components. In some such examples, the average may be weighted based on confidence estimates received at the target UE from the supporting UE and the additional supporting UE. In addition or alternatively, the location information for the particular reflector may be determined using a joint optimisation process.

In some examples, the means may comprise: at least one processor; and at least one memory storing instructions that, when executed by the at least one processor, cause performance of the apparatus.

In a second aspect, this specification describes an apparatus comprising at least one processor and at least one memory storing instructions that, when executed by the at least one processor, cause the apparatus at least to perform: receiving, at a target user equipment, UE, a signal including information indicative of supporting UE measurements of signals transmitted from the target UE to a supporting UE via a multipath communications channel, the supporting UE measurements including delay and angle measurements of the signals transmitted from the target UE to the supporting UE via the multipath communications channel; time-aligning the supporting UE measurements with target UE measurements of signals transmitted from the supporting UE to the target UE via the multipath communications channel, the target UE measurements including delay and angle measurements for the signals transmitted from the supporting UE to the target UE via the multipath communications channel; determining, based on the time-aligned measurements, an association between a component of the target UE measurements and at least one respective component of the supporting UE measurements, wherein the associated components are determined to correspond to a particular reflector in an environment of the target UE; and determining, based on the associated components, location information for the particular reflector.

In some examples, time-aligning the supporting UE measurements with the target UE measurements may comprise determining a common delay-domain origin based on an Rx-Tx time difference of the target UE, an Rx-Tx time difference of the supporting UE, a shortest delay of the supporting UE measurements and a shortest delay of the target UE measurements.

In some examples, the supporting UE measurements may further include power measurements of the signals transmitted from the target UE to the supporting UE via the multipath communications channel, and the target UE measurements may further include power measurements for the signals transmitted from the supporting UE to the target UE via the multipath communications channel. In some such examples, the target UE measurements and/or the supporting UE measurements may be resampled in the delay domain such that the target UE measurements and the supporting UE measurements have a common delay resolution, and the association may be determined based on the resampled measurements. In some such examples, the target UE power measurements and the supporting UE power measurements may be pruned and/or normalised prior to the resampling. In addition or alternatively, in some examples, the resampling may be based on a target channel response generated based on the target UE measurements and/or a supporting channel response generated based on the supporting UE measurements. In some such examples, the resampling may comprise convolving the target channel response and/or the supporting channel response with a filter having the common delay resolution. In addition or alternatively, in some examples, the resampling may comprise applying, to the target channel response and/or the supporting channel response, a discrete Fourier transform, DFT, followed by an inverse discrete Fourier transform, IDFT, wherein the IDFT has the common delay resolution.

In some examples, the at least one respective component of the supporting UE measurements may be determined to be associated with the component of the target UE measurements based on a minimisation of a divergence metric between the component of the target UE measurements and the at least one respective component of the supporting UE measurements. In some examples, the at least one memory may store instructions that, when executed by the at least one processor, cause the apparatus at least to perform: aligning a coordinate system of the target UE with a coordinate system of the supporting UE based on a common reference direction. In some examples, the at least one respective component of the supporting UE measurements may be determined to be associated with the component of the target UE measurements based on either: a delay measurement of the at least one respective component of the supporting UE measurements being within a threshold delay of a delay measurement of the component of the target UE measurements; and/or a power measurement of the at least one respective component of the supporting UE measurements being within a threshold power of a power measurement of the component of the target UE measurements.

In some examples, the location information for the particular reflector may include at least one of: a distance and/or angle from the target UE to the particular reflector; a distance and/or angle from the supporting UE to the particular reflector; a distance and/or angle from a neighbouring UE to the particular reflector; a position of the particular reflector with respect to a local coordinate system, LCS, of the target UE, the supporting UE, and/or a neighbouring UE; and/or a position of the particular reflector with respect to a global coordinate system, GCS. In some examples, the at least one memory may store instructions that, when executed by the at least one processor, cause the apparatus at least to perform determining a position of the particular reflector relative to the target UE based on the determined location information.

In some examples, the at least one memory may store instructions that, when executed by the at least one processor, cause the apparatus at least to perform: receiving, at a target user equipment, UE, a signal including information indicative of additional supporting UE measurements of signals transmitted from the target UE to an additional supporting UE via an additional multipath communications channel, the additional supporting UE measurements including delay and angle measurements of the signals transmitted from the target UE to the additional supporting UE via the additional multipath communications channel; time-aligning the additional supporting UE measurements with additional target UE measurements of signals transmitted from the additional supporting UE to the target UE via the additional multipath communications channel, the additional target UE measurements including delay and angle measurements for the signals transmitted from the additional supporting UE to the target UE via the additional multipath communications channel; and determining, based on the additional time-aligned measurements, an additional association between a component of the additional target UE measurements and at least one respective component of the additional supporting UE measurements, wherein the additionally associated components may be determined to correspond to the particular reflector, and the determination of the location information for the particular reflector may be further based on the additionally associated components. In some such examples, the location information for the particular reflector may be determined based on an average of location information determined based on the associated components and location information determined based on the additionally associated components. In some such examples, the average may be weighted based on confidence estimates received at the target UE from the supporting UE and the additional supporting UE. In addition or alternatively, the location information for the particular reflector may be determined using a joint optimisation process.

In a third aspect, this specification describes a user equipment device comprising an apparatus as described with reference to the first or second aspects.

In a fourth aspect, this specification describes a method comprising: receiving, at a target user equipment, UE, a signal including information indicative of supporting UE measurements of signals transmitted from the target UE to a supporting UE via a multipath communications channel, the supporting UE measurements including delay and angle measurements of the signals transmitted from the target UE to the supporting UE via the multipath communications channel; time-aligning the supporting UE measurements with target UE measurements of signals transmitted from the supporting UE to the target UE via the multipath communications channel, the target UE measurements including delay and angle measurements for the signals transmitted from the supporting UE to the target UE via the multipath communications channel; determining, based on the time-aligned measurements, an association between a component of the target UE measurements and at least one respective component of the supporting UE measurements, wherein the associated components are determined to correspond to a particular reflector in an environment of the target UE; and determining, based on the associated components, location information for the particular reflector.

In some examples, time-aligning the supporting UE measurements with the target UE measurements may comprise determining a common delay-domain origin based on an Rx-Tx time difference of the target UE, an Rx-Tx time difference of the supporting UE, a shortest delay of the supporting UE measurements and a shortest delay of the target UE measurements.

In some examples, the supporting UE measurements may further include power measurements of the signals transmitted from the target UE to the supporting UE via the multipath communications channel, and the target UE measurements may further include power measurements for the signals transmitted from the supporting UE to the target UE via the multipath communications channel. In some such examples, the target UE measurements and/or the supporting UE measurements may be resampled in the delay domain such that the target UE measurements and the supporting UE measurements have a common delay resolution, and the association may be determined based on the resampled measurements. In some such examples, the target UE power measurements and the supporting UE power measurements may be pruned and/or normalised prior to the resampling. In addition or alternatively, in some examples, the resampling may be based on a target channel response generated based on the target UE measurements and/or a supporting channel response generated based on the supporting UE measurements. In some such examples, the resampling may comprise convolving the target channel response and/or the supporting channel response with a filter having the common delay resolution. In addition or alternatively, in some examples, the resampling may comprise applying, to the target channel response and/or the supporting channel response, a discrete Fourier transform, DFT, followed by an inverse discrete Fourier transform, IDFT, wherein the IDFT has the common delay resolution.

In some examples, the at least one respective component of the supporting UE measurements may be determined to be associated with the component of the target UE measurements based on a minimisation of a divergence metric between the component of the target UE measurements and the at least one respective component of the supporting UE measurements. In some examples, the method may further comprise: aligning a coordinate system of the target UE with a coordinate system of the supporting UE based on a common reference direction. In some examples, the at least one respective component of the supporting UE measurements may be determined to be associated with the component of the target UE measurements based on either: a delay measurement of the at least one respective component of the supporting UE measurements being within a threshold delay of a delay measurement of the component of the target UE measurements; and/or a power measurement of the at least one respective component of the supporting UE measurements being within a threshold power of a power measurement of the component of the target UE measurements.

In some examples, the location information for the particular reflector may include at least one of: a distance and/or angle from the target UE to the particular reflector; a distance and/or angle from the supporting UE to the particular reflector; a distance and/or angle from a neighbouring UE to the particular reflector; a position of the particular reflector with respect to a local coordinate system, LCS, of the target UE, the supporting UE, and/or a neighbouring UE; and/or a position of the particular reflector with respect to a global coordinate system, GCS. In some examples, the method may further comprise determining a position of the particular reflector relative to the target UE based on the determined location information.

In some examples, the method may further comprise: receiving, at a target user equipment, UE, a signal including information indicative of additional supporting UE measurements of signals transmitted from the target UE to an additional supporting UE via an additional multipath communications channel, the additional supporting UE measurements including delay and angle measurements of the signals transmitted from the target UE to the additional supporting UE via the additional multipath communications channel; time-aligning the additional supporting UE measurements with additional target UE measurements of signals transmitted from the additional supporting UE to the target UE via the additional multipath communications channel, the additional target UE measurements including delay and angle measurements for the signals transmitted from the additional supporting UE to the target UE via the additional multipath communications channel; and determining, based on the additional time-aligned measurements, an additional association between a component of the additional target UE measurements and at least one respective component of the additional supporting UE measurements, wherein the additionally associated components may be determined to correspond to the particular reflector, and the determination of the location information for the particular reflector may be further based on the additionally associated components. In some such examples, the location information for the particular reflector may be determined based on an average of location information determined based on the associated components and location information determined based on the additionally associated components. In some such examples, the average may be weighted based on confidence estimates received at the target UE from the supporting UE and the additional supporting UE. In addition or alternatively, the location information for the particular reflector may be determined using a joint optimisation process.

In a fifth aspect, this specification describes a non-transitory computer readable medium comprising program instructions stored thereon for performing at least any of the operations described above with reference to the first to fourth aspects.

BRIEF DESCRIPTION OF THE FIGURES

For better understanding of the present application, reference will now be made by way of example to the accompanying drawings in which:

FIG. 10 is a flowchart illustrating various operations which may be performed in accordance with examples described herein;

FIG. 12 is a flowchart illustrating various operations which may be performed in accordance with examples described herein;

DETAILED DESCRIPTION

Figure 1:
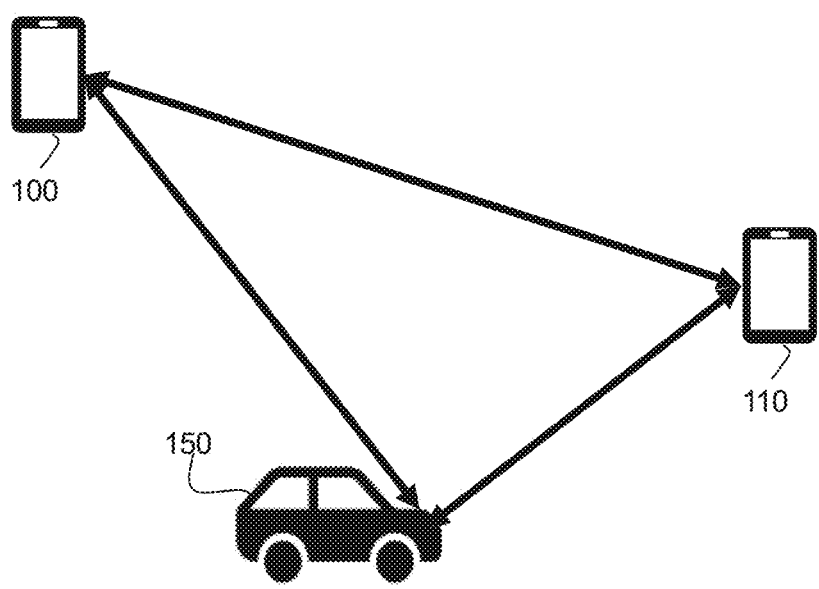
FIG. 1 is an example illustrating communications between a target UE and a supporting UE.

In the description and drawings below, like reference numerals refer to like elements throughout.

It may be beneficial for terminal devices, such as UE devices, to be capable of accurate positioning and ranging. For instance, for applications relating to vehicle-to-everything (V2X) communications to ensure road and traffic safety, it may be beneficial for a target UE (e.g. but not limited to, a UE device mounted on a car or carried by a pedestrian) to be capable of accurate positioning and ranging. Positioning capability may refer to the UE's ability to determine its location in an environment, while ranging capability may refer to the UE's ability to identify distances and/or directions to various objects in its environment. Such positioning and ranging capabilities may relate to the UE's ability to identify stationary and/or mobile reflectors in the environment of the UE. In a V2X context, such identification may be useful in avoiding collisions between a vehicle or pedestrian carrying the UE and the identified reflectors.

Implementations of the technology described herein relate to use of UE-to-UE communications in identifying reflectors in an environment of one or more UEs. Some example aspects described herein relate to the exchange of information between UEs in an environment to facilitate identification of reflectors in the environment. Other example aspects, which may be dependent on the exchange of information between UEs, relate to determination of a distance and/or direction from a target UE to a reflector in an environment of the target UE, and may enable accurate determination of such distances and/or direction. Such accurate determination may be achieved, at least in part, by combining information collected at the target UE with information received from other, nearby UE devices, sometimes referred to as 'supporting UEs' or 'peer' UEs. In some examples, the information may be exchanged between UE devices via direct communication between the target UE and supporting UEs, which may, in some examples, be referred to as 'sidelink' (SL) communication. Combining information collected at the target UE with information received from one or more supporting UEs (e.g. but not limited to, ranging channel information, RCI) as described herein may allow for reflectors to be charted at the UE-side (i.e. at the target UE, rather than at the network-side). Put another way, various implementations of the technology described herein may provide a procedure in which SL-capable UEs exchange information (e.g. but not limited to, RCI information including round trip time, RTT, information, and/or RTT-like information) and use the information to identify reflectors in the environment. Furthermore, various implementations described herein may allow UEs to identify and map the most relevant reflectors, and may do so without requiring that the UEs are synchronized in advance. For instance, various implementations of the technology described herein may build on a channel reciprocity assumption, allowing the target UE to vet out 'fake' reflectors with the aid of one or more supporting UEs, whilst acquiring the range or position of 'real' reflectors in the environment.

In some examples, information collected from supporting UEs may be transformed so as to reduce or eliminate any UE-specific bias that relates to the detection of reflectors from the perspective of the supporting UE that collected the information. For instance, information collected from supporting UEs may be time-aligned (e.g. using a common delay-domain origin). In addition or alternatively, a local coordinate system (LCS) of the supporting UE may be oriented to correspond in orientation to an LCS of the target UE (e.g., so that the UEs share a consistent local angular representation for use in reporting angle measurements). The transformed information may be used to detect reflectors in the vicinity of the target UE, with detected reflectors being validated on the basis of channel reciprocity between SL channels from the perspective of both the target UE and the supporting UE. In some examples, estimated locations of the validated reflectors relative to the target UE and/or the supporting UEs may be used to localise the reflectors.

Although by no means limited to such an implementation, the examples of the technology described herein may readily be integrated into any new radio (NR) UE which performs SL positioning as standardised in 3GPP Release 18. Furthermore, examples of the technology described herein may be compliant with future extensions to TS 38.321 and TS 37.355 to support simultaneous positioning and ranging and reflector detection procedures, which are expected to be specified in 3GPP Release 19.

For various applications, such as (but not limited to) public safety, V2X, extended reality (XR), and industrial Internet of Things (IoT) applications, a NR UE may require the capability to perform both localisation and ranging, either simultaneously or sequentially. In some situations, such localisation and ranging needs to be performed at a frequency determined by the application. For instance, in a V2X setting, the required frequency may be proportional to the speed of the UE. Performing simultaneous localisation and ranging can be challenging to achieve in practice, not least because a single procedure to fulfil both purposes (i.e. to deploy sensing together with ranging) has not yet been identified by 3GPP. On the other hand, sequential approaches, which require the UE to deploy two independent localization and ranging sessions, may entail double signalling and computational complexity costs as compared to the simultaneous alternative. Various implementations of the technology described herein may enable performance of simultaneous localisation and ranging by V2X UEs, whilst minimizing procedural overhead.

Figure 8:
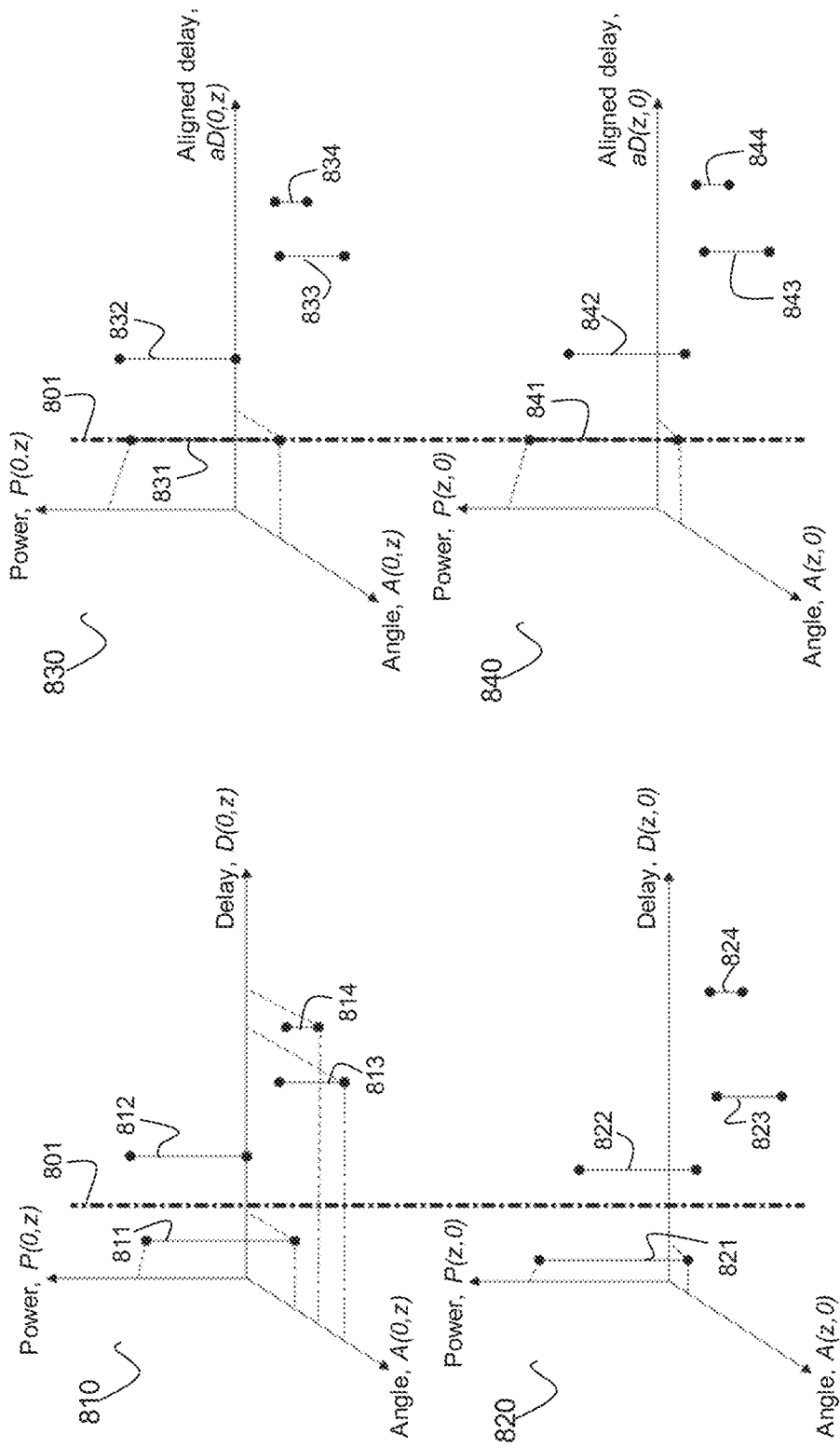
FIG. 8 is an example illustrating time alignment of UE measurements.

In some examples, the term 'user equipment' may refer to any device employed by a user to communicate. Whilst the UEs of FIGS. 1 and 8 are depicted as mobile telephones, it will of course be appreciated that UEs may comprise various other devices, including, but not limited to laptops, smartwatches, tablet computers and vehicle-based UEs, such as those mounted on cars, buses, uncrewed aerial vehicles (UAVs), aeroplanes, trains, or boats. Alternatively, mobile UE devices may be carried by a user, or worn on their person.

In some examples, the term 'reflector' may refer to any entity in the environment that causes signals (e.g. but not limited to, RF signals) transmitted to or from a UE to be reflected. For instance, in some examples, a positioning reference signal (e.g. a SL-PRS) may be transmitted from a first UE for reception at a second UE via a multipath communications channel. In some examples, whilst a first component of the signals received at the second UE may have travelled via a shortest propagation path (e.g. but not limited to, a line of sight path) between the first UE and the second UE, one or more other components of the signals received at the second UE may have travelled via paths other than the shortest propagation path. For instance, whilst signals transmitted via the shortest propagation path may travel in a substantially straight line between the first UE and the second UE, signals transmitted via paths other than the shortest propagation path may be reflected by the ground, atmosphere, buildings, vehicles, pedestrians, animals, street furniture or other objects in the environment before reaching the second UE. As will of course be appreciated, in some examples, signal components transmitted via paths other than the shortest propagation path may have a greater propagation delay and may incur a stronger attenuation than signal components transmitted via the shortest propagation path.

Various methods and apparatuses are described in detail below, by way of example only, in the context of a cellular network, such as an Evolved Universal Terrestrial Radio Access (E-UTRA) network or a 5G network. However, it will be appreciated that the techniques may be applicable with communications networks of other types (e.g. but not limited to other types of cellular network). Cellular networks may comprise one or more base stations, sometimes referred to as transmit-receive points (TRPs) or access points (e.g. but not limited to gNBs and/or eNBs). Whilst base stations are not depicted in FIG. 1, a radio access network (RAN, NG-RAN) may typically comprise thousands of such base stations. Together, the base stations may provide cellular network coverage to one or more UEs over a wide geographical area. As described above, various UEs may also be capable of directly communicating with other UE devices using SL or D2D communication. For instance, such direct communication may refer to communication between UEs without traversing base stations or the core network (CN). In some examples, SL or D2D communications may offer improved spectral efficiency, throughput, energy efficiency, and/or delay as compared to conventional cellular communications via a base station.

In some implementations and, for instance, depending on the characteristics of the cellular network, the base stations and UEs within the network may be configured to communicate with one another, for instance, using an OFDM-based communication scheme, such as orthogonal frequency-division multiple access (OFDMA), single carrier frequency-division multiple access (SC-FDMA), and/or cyclic prefix orthogonal frequency-division multiple access (CP-OFDMA). For instance, in some non-limiting examples, CP-OFDMA may be used for SL communications. In addition or alternatively, OFDMA may be used for downlink (DL) communications and SC-FDMA may be used for uplink (UL) communications.

For simplicity, and by way of example only, in the following described examples a target UE may be referred to as UE(o), a supporting UE may be referred to as UE(z), and an additional supporting UE may be referred to as UE(y). In such examples, 'link z' may refer to the communications link between UE(o) and UE(z), whilst 'link y' may refer to the communications link between UE(o) and UE(y).

In some examples, RCI(a,b) may refer to the ranging channel information between UE(a) and UE(b) as measured at UE(a). In some examples, h(a,b) or CIR(a,b) may refer to the channel impulse response for the channel between UE(a) and UE(b) as measured at UE(a). Moreover, in some examples, measurement M(a,b)(l) may refer to the lth component (i.e. 'relevant reflection') of a measurement M of signals received via the channel between UE(a) and UE(b), as measured at UE(a). In the following discussion, delay measurements may be denoted by 'D', power/gain measurements by 'P' and angle of arrival measurements by 'A'. For instance, D(o,z)(k) may refer to the propagation delay for the kth component of measured signals received via the channel between UE(o) (the target UE) and UE(z) (the supporting UE), as measured at UE(o). As will of course be appreciated, the measurements described herein may include all or a subset of the delay, angle and gain/power measurements, and/or one or more linear combinations of such measurements.

FIG. 1 depicts a target UE 100 together with supporting UE 110 and reflector 150. By way of example only, reflector 150 is depicted as a car. However, it will of course be appreciated that reflector 150 may instead comprise any object(s) in the environment that causes signals to be reflected, including but not limited to those described above. Moreover, it will further be appreciated that different numbers of UEs and/or reflectors are possible, as well as UEs and/or reflectors of different positions, separations or orientations.

In general terms, FIG. 1 relates to a situation in which target UE 100 makes use of information received from supporting UE 110 to determine a distance and/or a direction to particular reflector 150. During the discussion of FIG. 1, reference will, at certain points, be made to the example message flow sequence of FIG. 2, which depicts an example of various communications which may be exchanged between at least a target UE 100 and a peer/supporting UE 110 according to some implementations.

In particular, target UE 100 receives a signal including information indicative of supporting UE measurements of signals transmitted from target UE 100 to a supporting UE 110 via a multipath communications channel. The supporting UE measurements may include at least delay and angle measurements of the signals transmitted from target UE 100 to the supporting UE 110 via the multipath communications channel. Receipt of such a signal may be as illustrated by, and described in more detail below with reference to, operation 210 of FIG. 2.

Having received the supporting UE measurements, target UE 100 time-aligns the supporting UE measurements with target UE measurements of signals transmitted (e.g. as described with reference to operation 214 of FIG. 2) from supporting UE 110 to target UE 100 via the multipath communications channel. Such target UE measurements may also include at least delay and angle measurements for the signals transmitted from supporting UE 110 to target UE 100 via the multipath communications channel.

The target UE 100 then determines an association between a component of the target UE measurements and at least one respective component of the supporting UE measurements (e.g. as described with reference to operation 215 of FIG. 2), wherein the associated components are determined to correspond to a particular reflector 150 in an environment of target UE 100. Based on the associated components, target UE 100 then determines a distance and/or a direction from target UE 100 to particular reflector 150 (e.g. as described with reference to operation 216 of FIG. 2).

The signals transmitted from target UE 100 to supporting UE 110 (e.g. as described with reference to operation 206 of FIG. 2) via the multipath communications channel may be, but are not limited to, positioning reference signals such as sidelink positioning reference signals (SL-PRS). The supporting UE may perform measurements in respect of these signals (e.g. as described with reference to operation 207 of FIG. 2) and may then send to the target UE 100 directly or indirectly (e.g. as described with reference to operation 210 of FIG. 2) information indicative of the measurements performed by supporting UE 110 (henceforth referred to as 'supporting UE measurements'). As noted above, the supporting UE measurements may include at least delay and angle measurements. The supporting UE measurements may further include timestamps corresponding to reception of the transmitted signals at the supporting UE and/or timestamps corresponding to transmission by the supporting UE of a reply to the signals. In some examples, the supporting UE measurements may include a time-difference (TD) between the reception of the transmitted signals and transmission of the supporting UE's reply. In some such examples, the TD may be referred to as a Rx-Tx time difference.

In some examples, the supporting UE measurements may include ranging channel information (RCI). For instance, the RCI may include a channel periodogram (i.e. an estimate of the power spectral density of the measured signals) and/or a channel impulse response (CIR) and/or a channel frequency response (CFR). In addition or alternatively, the supporting UE measurements may include a list of components (i.e. 'taps') of the measured signals caused by propagation via the multipath communications channel. For instance, components of the measured signals may correspond to signals received at the supporting UE via different paths (e.g. due to reflections caused by other objects in the vicinity). In some examples, the list of components may include arrival angles, propagation delays, and/or powers (i.e. gains) for each component. In addition or alternatively, the list of components may further include phase measurements and/or amplitude measurements for each component. In some examples, certain components may be referred to as 'relevant reflections'. In some examples, the supporting UE measurements may further include information characterising the relevant reflections in the frequency domain.

As noted above, the supporting UE 110 may also send positioning reference signals, e.g. sidelink positioning reference signals (SL-PRS), to the target UE 100 (e.g. as described with reference to operation 208 of FIG. 2). The target UE 100 may perform measurements (henceforth referred to as 'target UE measurements') of these signals. (e.g. as described with reference to operation 209 of FIG. 2) The supporting UE measurements may then be time-aligned, e.g. by the target UE (for instance as described with reference to operation 214), with the target UE measurements. In some examples, the target UE measurements may substantially correspond in type to the supporting UE measurements. For instance, the target UE measurements may include at least delay and angle measurements for the signals transmitted from supporting UE 110 to target UE 100 via the multipath communications channel. In some examples, the target UE measurements may further include timestamps corresponding to reception of the transmitted signals at the target UE and/or timestamps corresponding to transmission of a reply to the signals by the target UE. In some examples, the target UE measurements may include a time-difference (TD) between the reception of and reply to the transmitted signals. In some such examples, the TD may be referred to as a Rx-Tx time difference.

In addition or alternatively, the target UE measurements may, in some examples, include ranging channel information (RCI) such as described with reference to the supporting UE measurements. For instance, the RCI may include a channel periodogram and/or a CIR and/or a CFR. In addition or alternatively, the target UE measurements may include a list of components (i.e. 'taps') of the measured signals caused by propagation via the multipath communications channel. In some examples, components of the measured signals may correspond to signals received at the target UE via different paths (e.g. due to reflections caused by other objects in the vicinity). In some examples, the list of components may include arrival angles, propagation delays, and/or powers (i.e. gains) for each component. In some examples, the components may be referred to as 'relevant reflections'.

The target UE 100 may cause its local coordinate system (LCS) and the LCS of supporting UE 110 to be aligned (e.g. as described with reference to operations 201 to 203 of FIG. 2, and/or with reference to FIGS. 11 and 12). Such alignment may, in some examples, be referred to as coordinate system alignment (CSA), and may be such as to cause both UEs to share the same notion as to what an angle of arrival or departure is with respect to a spatial direction. Put another way, the alignment may be such that angular information (e.g. an angle of arrival of a measured signal) has a consistent meaning at both the target UE and the supporting UE. In some examples, the alignment may be performed prior to performance of the measurements by supporting UE 110 (for instance, but not limited to, in response to a request from target UE 100). Alternatively, in some examples, angular measurements made at the supporting UE may be 'translated' into equivalent measurements for the target UE. In some examples, this alignment process may be referred to as angle domain synchronisation (ADS). As will of course be appreciated, in some examples, multiple supporting UEs may be caused to align their local coordinate systems with the LCS of a single target UE. Whilst aspects of the present disclosure relate to aligning the LCS of a supporting UE with that of a target UE, it will be further appreciated that the techniques described herein may be applicable to aligning the LCSs of any particular pair of UEs (e.g. a first UE and a second UE).

As described above, and by way of example only, target UE 100 may be referred to as UE(o) and supporting UE 110 may be referred to as UE(z). For the link z between target UE 100 and supporting UE 110, a time of travel, TOT(z), may be computed (e.g. as illustrated by operation 213 of FIG. 2). In some examples, TOT(z) may be computed as half the difference between TD(o) and TD(z).

Figure 3:
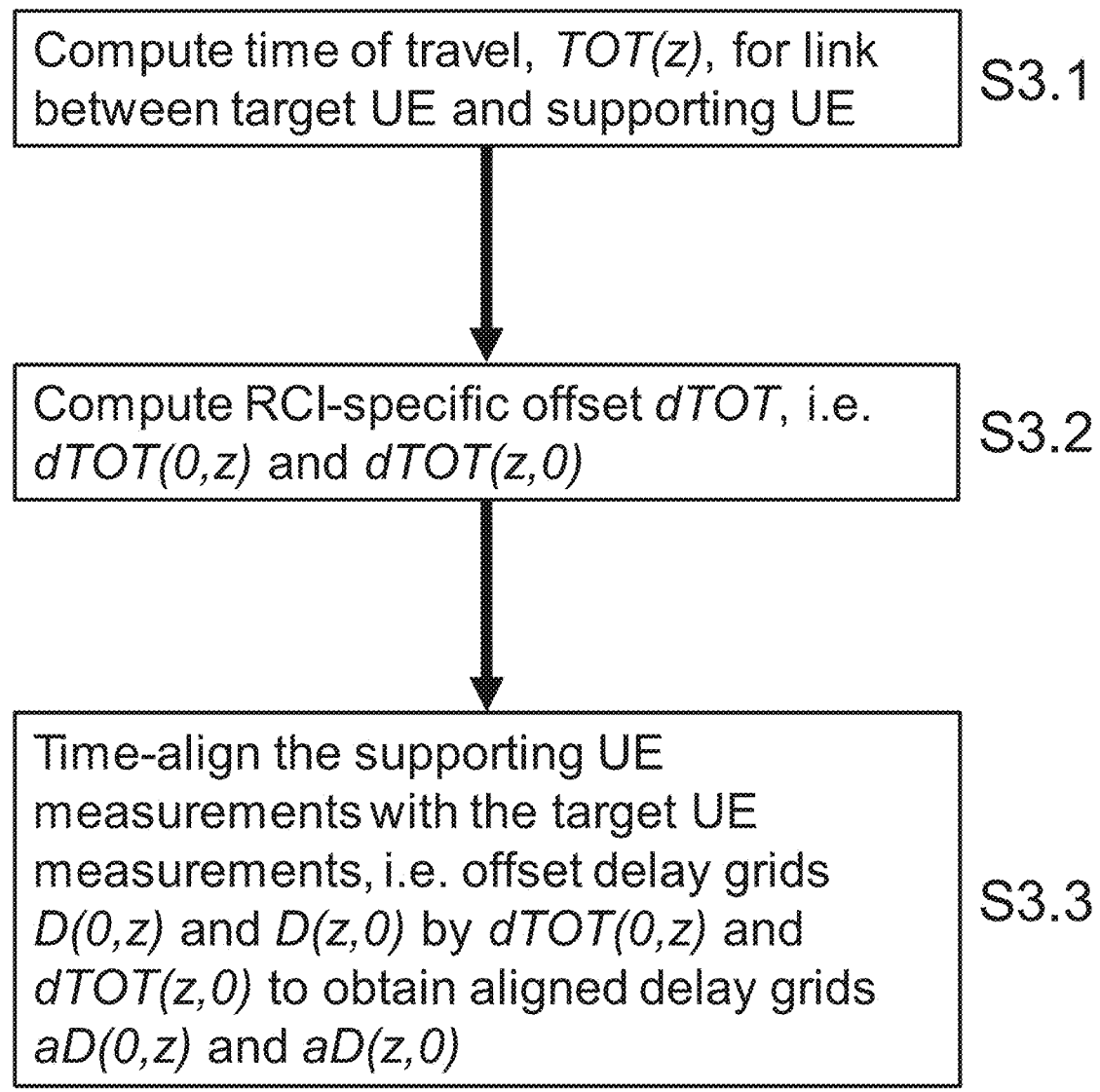
FIGS. 3 to 7 are flowcharts illustrating various operations which may be performed in accordance with examples described herein.

In some examples, the supporting UE measurements may be time-aligned with the target UE measurements (e.g. as in operation 214). For instance, this may be achieved by determining a common delay-domain origin using a time of travel for the link between the target UE and the supporting UE. Put another way, the target UE may determine a reference point for the channel response in the delay domain. Aspects of this time-alignment process are described herein with reference to operations S3.1 to S3.3 as depicted in FIG. 3. As illustrated in S3.1 of FIG. 3, the time of travel may be computed as TOT(z) above. Next, in S3.2 the common delay origin may be established by determining an RCI-specific offset referred to as 'dTOT'. For instance, two RCI-specific offsets for link z may be determined as dTOT(0,z)=|D(0,z)(1)−TOT(z)| and dTOT(z,0)=|D(z,0)(1)−TOA(z)|, where D(0,z)(1) and D(z,0)(1) are the delay measurements corresponding to the first component (i.e. the component of least delay) of the signals measured at the target UE and supporting UE respectively. The first component may correspond to signals propagated via a shortest propagation path between target UE 100 and supporting UE 110 (e.g. but not limited to a line of sight path).

In operation S3.3, once the offsets have been determined, target UE 100 may then time-align the supporting UE measurements with the target UE measurements by shifting the delay measurements by the respective determined offsets. For example, the target UE may calculate 'aligned' delay vectors as aD(0,z)=D(0,z)−dTOT(0,z) and aD(z,0)=D(z,0)−dTOT(z,0). Put another way, delay measurements from target UE 100 and supporting UE 110 may be transformed such that their axes are aligned.

In some examples, the delay measurements from the supporting UE and target UE have different delay resolutions. Harmonising these delay resolutions may, in some examples, help to facilitate detection and validation of reflectors as described herein. As such, in some examples, the target UE measurements and/or the supporting UE measurements may be resampled in the delay domain such that the target UE measurements and the supporting UE measurements have a common delay resolution (also referred to as a 'common sampling rate'). Aspects of this harmonisation process are described herein with reference to FIG. 4.

In operation S4.1, the target UE power measurements and the supporting UE power measurements are normalised prior to the resampling. This may be referred to as 'power standardisation'. For instance, the powers may be weighted so that the total power per RCI is equal to 1. In some such examples, the normalised powers may be calculated as $$P(z,0)(l) = \frac{P(z,0)(l)}{\sum_s P(z,0)(s)} \text{ and } P(0,z)(v) = \frac{P(0,z)(v)}{\sum_w P(0,z)(w)},$$

where the sum over s refers to a sum over all components of the supporting UE measurements and the sum over w refers to a sum over all components of the target UE measurements. It will be further appreciated that the measurements may be pruned prior to the resampling.

A target channel response h(o,z)(t) at time t may be generated based on the target UE measurements and a supporting channel response h(z,o)(t) may be generated based on the supporting UE measurements. For instance, in some examples, the target channel response may be given by $h(0,z)(t)=\Sigma_l \sqrt{P(0,z)(l)} \exp(jA(0,z)(l))\delta(t-D(0,z)(l))$ and the supporting channel response may be given by $h(z,0)(t)=\Sigma_l \sqrt{P(z,0)(l)} \exp(jA(z,0)(l))\delta(t-D(z,0)(l))$.

In operation S4.2, resampling of the delay measurements may be performed such that the delay resolution of the supporting UE measurements matches that of the target UE measurements. In some examples, the resampling may be performed based on a target channel response and/or supporting channel response as determined above. For instance, the resampling may be achieved by convolving the target channel response and/or the supporting channel response with a filter having the common delay resolution. Alternatively, in some examples the resampling may be performed by applying, to the target channel response and/or the supporting channel response, a discrete Fourier transform, DFT, followed by an inverse discrete Fourier transform, IDFT, wherein the IDFT has the common delay resolution.

In operation S4.3, once the measurements have been 'harmonised' (e.g. in the angle, delay, and delay resolution domains), an association between a component of the target UE measurements and at least one respective component of the supporting UE measurements may be determined based on the time-aligned measurements. Put another way, each component of the target UE measurements is associated with a group or cluster of one or more components of the supporting UE measurements. In some examples, the component of the target UE measurements associated with each cluster is referred to as the 'primary component'. Specific examples of how the association process of S4.3 may be performed are described below with reference to FIGS. 6 and 7.

By the channel reciprocity principle, reflectors in the environment of the UEs may be validated based on their 'visibility' to both the target UE and the supporting UE. That is to say, if a reflection occurs in approximately the same place in measurements performed at both UEs, there is a high likelihood that a 'real' reflector occupies that position in the environment. As such, the associated components may be determined to correspond to a particular reflector 150 in an environment of target UE 100. By way of example only, in the following discussion, the components associated with particular reflector 150 are referred to as the $k^{th}$ component of the UE measurements.

Having associated components of the target UE measurements with components of the supporting UE, a distance from target UE 100 to particular reflector 150 may be determined based on the associated components. For instance, if particular reflector 150 corresponds to the $k^{th}$ component of the UE measurements (as mentioned above), and given (x,y) as the position of target UE 100 (e.g. in a global coordinate system, GCS) and $(x_z,y_z)$ as the position of supporting UE 110 (e.g. in the GCS), the distance between target UE 100 and particular reflector 150 may be given by the following:

$$d_k(0) = \frac{|y_z - y| - d\sin(A(z, 0)(k))}{\sin(A(z, 0)(k)) + \sin(A(0, z)(k))},$$

where d=c×aD(0,z)(k) (c being the speed of light≈3×10$^8$ ms$^{-1}$) is the path distance covered by signals corresponding to the k$^{th}$ component (i.e. the distance from supporting UE 110 to particular reflector 150 and then to target UE 100), and y$_z$ is the Y-axis location of the supporting UE.

In some examples, target UE 100 may determine a position of particular reflector 150 relative to target UE 100 based on the determined distance and an angle measurement for the corresponding component of the target UE measurements. For instance, such a relative position may be indicated using polar coordinates. Alternatively, target UE 100 may obtain an absolute position of particular reflector 150 as x0(k)=d$_k$(0) cos(A(0,z)(k))±x and y0(k)=d$_k$(0)sin(A(0,z)(k)) ±y.

Further aspects of how the position and/or range of particular reflector 150 may be determined are described below with reference to FIG. 9.

In some examples, multiple UEs may be available within a geographical area. As such, multiple UE pairs may be able to operate together so as to increase the effectiveness of the reflector charting process described above. For instance, target UE 100 may receive a signal including information indicative of additional supporting UE measurements of signals (e.g. but not limited to, SL-PRS) transmitted from the target UE to an additional supporting UE (i.e. a nearby UE that is different from target UE 100 and supporting UE 110) via an additional multipath communications channel. The additional supporting UE measurements may include delay and angle measurements of the signals transmitted from the target UE to the additional supporting UE via the additional multipath communications channel. The additional supporting UE measurements may be performed in a similar manner to the supporting UE measurements described above.

In such examples, target UE 100 may time-align the additional supporting UE measurements with additional target UE measurements of signals (e.g. but not limited to, SL-PRS) transmitted from the additional supporting UE to target UE 100 via the additional multipath communications channel. The additional target UE measurements may include delay and angle measurements for the signals transmitted from the additional supporting UE to target UE 100 via the additional multipath communications channel. The additional target UE measurements may be performed in a similar manner to the target UE measurements described above.

In such examples, based on the additional time-aligned measurements, target UE 100 may determine an additional association between a component of the additional target UE measurements and at least one respective component of the additional supporting UE measurements, wherein the additionally associated components may be determined to correspond to the particular reflector. Moreover, in such examples, the determination of the distance from the target UE to the particular reflector may be further based on the additionally associated components.

The process described herein may, in some examples, be performed for multiple pairs of UEs in turn, with the results being combined to increase overall effectiveness. For instance, the reflector charting process described herein may be 'cold-started' by processing all available UEs at the same time. In some such examples, in particular those where UEs UE(o); UE(z); UE($y$) are available, the target UE UE(o) may perform the following steps:

a. collect UE measurements as described above (e.g. but not limited to, RCI measurements) corresponding to each possible pair of UEs, e.g. {RCI(o,z), RCI(z,o)}; {RCI(o, $y$), RCI($y$,o)}; {RCI(z, $y$), RCI($y$,z)}, b. time-align delay measurements for each link, as described above, c. normalise the power measurements, as described above, d. harmonise delay resolution for each link by resampling to a common sampling rate, as described above, e. calculate the distance between the reflector(s) and UE(o) using the measurements corresponding to combination of UE(o) with UE(z) and the measurements corresponding to the combination of UE(o) with UE($y$), as described above, f. for each supporting UE, calculate an estimate for the location of the reflector(s) using relative to the target UE, g. calculate a final estimate for the location of the reflector(s) based on an average of the individual estimates. In some examples, this average may be weighted by a confidence estimate provided to the target UE by the supporting UEs.

In some examples, steps e to g above may instead be performed via a joint optimisation process. For instance, in some examples, the distance from target UE 100 to particular reflector 150 may be determined by solving the following system of equations for d$_k$(o):

$$\begin{cases} d_k(0) - \dfrac{|y_z - y| - d\sin(A(z, 0)(k))}{\sin(A(z, 0)(k)) + \sin(A(0, z)(k))} + \epsilon_z = 0 \\ d_k(0) - \dfrac{|y_y - y| - d'\sin(A(y, 0)(k))}{\sin(A(y, 0)(k)) + \sin(A(0, y)(k))} + \epsilon_y = 0 \end{cases},$$

where $\epsilon_z, \epsilon_y$ are measurement errors associated with the UE measurement process for links o-z and o-y respectively, d=c×aD(0,z)(k) and d'=×aD(0,y)(k). In such examples, d may correspond to a distance from supporting UE(z) to the reflector plus a distance from reflector to the target UE, and d' may correspond to a distance from supporting UE($y$) to the reflector plus a distance from reflector to the target UE.

In some examples, the measurement errors may be estimated based on the received measurements or reported by the supporting UEs. It will be appreciated that, in some examples, measurements associated with other UE links (e.g. between UE(z) and UE($y$)) may also be included in the joint optimisation process.

Alternatively, the process described herein may be 'warm-started' by performing the charting process for UE(o) and UE(z) as described above, then refined using the output of the process as applied to combinations {UE(o), UE($y$)}, as well as {UE(z), UE($y$)}.

In some examples, the process described with reference to FIG. 1 may be performed at target UE 100. For instance, this process may be performed as part of a simultaneous positioning and ranging (SPR) session such as, but not limited to, that described with reference to FIG. 2.

Figure 2:
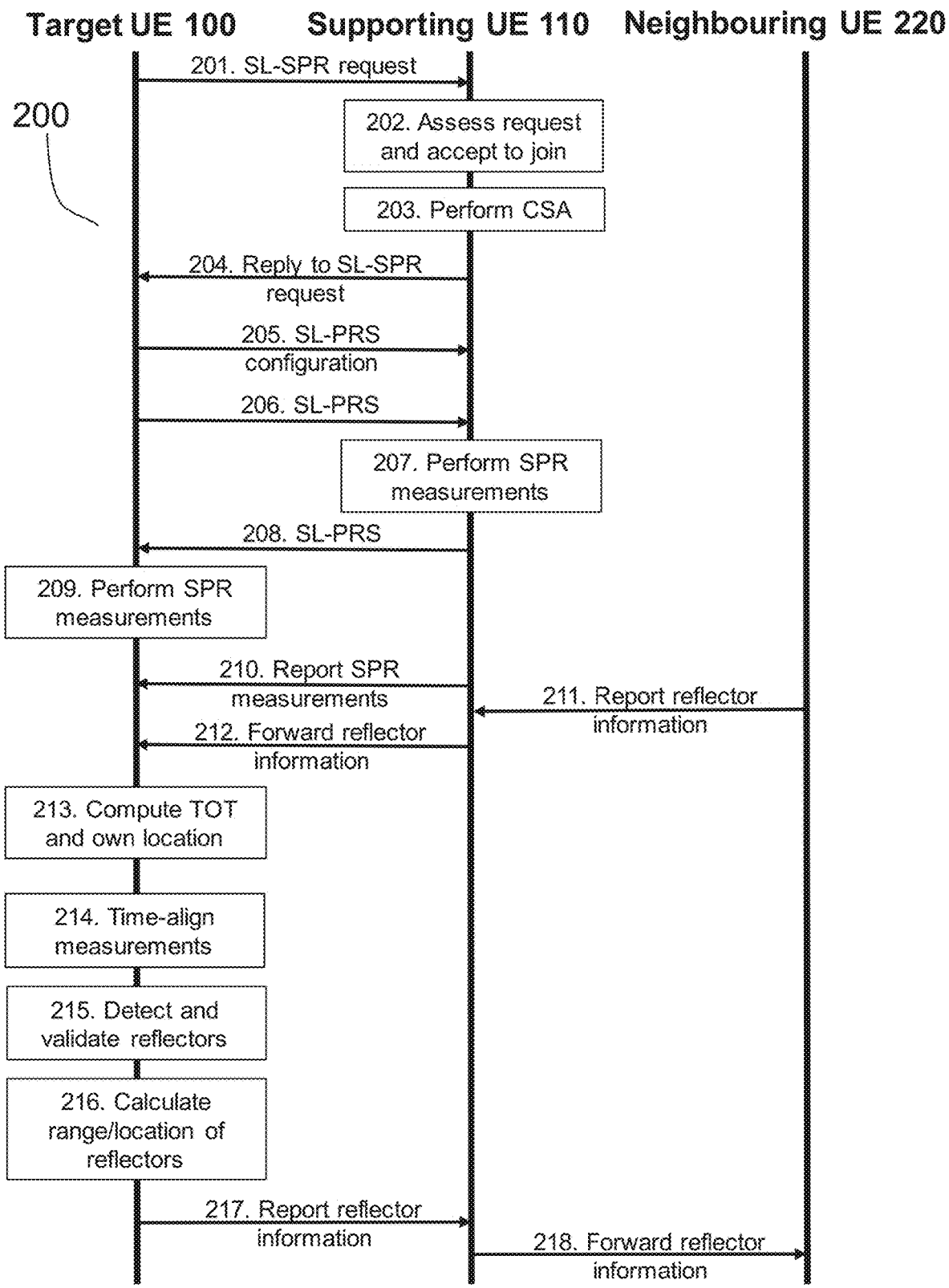
FIG. 2 is an example message flow sequence.

FIG. 2 is a message flow sequence, indicated generally by the reference numeral 200, in accordance with some examples of the described technology. The message flow sequence 200 shows an example implementation within which aspects of a process, such as that described with reference to FIG. 1, may be performed.

The message flow sequence 200 shows a signalling procedure between a target UE, a supporting UE and neighbouring UE 220. However, it will of course be appreciated that some implementations may not involve (or omit) the neighbouring UE 220. The target UE and supporting UE may, for example, be target UE 100 and supporting UE 110 described with reference to FIG. 1 above. In some examples, the message flow sequence may be triggered by the target UE so as to initiate a simultaneous positioning and ranging (SPR) session with one or more nearby UEs acting as 'supporting UEs'.

Whilst various operations are described below as being performed by a neighbouring UE 220, in some examples, such as those in which no neighbouring UE is present, these operations may be performed by a different UE (e.g. but not limited to, the target UE or supporting UE) or may be omitted from the message flow sequence.

In some examples, at operation 201, the target UE may send to one or more UEs in its environment (which may be referred to as peer UEs), request(s) for simultaneous positioning and ranging (SPR) measurements to be performed by those UEs. In some examples, the request for SPR measurements may be referred to as a request to join an 'SPR session'. Such request(s) may be broadcast e.g. via sidelink (SL) and, in some such examples, may be referred to as a SL-SPR request. The request may describe which types of SPR measurements are requested from the peer UE for use in the SPR process performed by the target UE. The requested SPR measurements may, in some examples, comprise measurements of a sidelink positioning reference signal (SL-PRS) transmitted by the target UE for reception at the peer UE via a wireless communications channel. For instance, in some examples, the requested measurements may include timestamps corresponding to reception of the SL-PRS at the peer UE and/or timestamps corresponding to transmission of a reply to the SL-PRS by the peer UE. In addition or alternatively, the requested measurements may include a time-difference (TD) between the reception of and reply to the SL-PRS. In some such examples, the TD may be referred to as a Rx-Tx time difference.

In addition or alternatively, the requested measurements may, in some examples, include ranging channel information (RCI). For instance, the RCI may include a channel and/or a CIR and/or a CFR. In addition or alternatively, the RCI may include a list of components of the received SL-PRS caused by a multipath propagation environment. For instance, in some examples, components of the received signal may correspond to signals received via different paths (e.g. due to reflections caused by other objects in the vicinity). In some examples, the list of components may include arrival angles, propagation delays, and/or powers for each component. In some examples, the components may be referred to as 'relevant reflections'.

In some examples, the request for SPR may further include a request for coordinate system alignment (CSA). Alternatively, the request for CSA may be sent (e.g. via SL) separately to the request for SPR. The request for CSA may include alignment information for use in orienting a local coordinate system, LCS, of the supporting UE to correspond in orientation to an LCS of the target UE. In this way, the local coordinate system of the peer UE may be aligned with that of the target UE in the angle domain.

At operation 202, having received the SPR request, the peer UE may assess whether it has the capability (for instance, but not limited to, based on available hardware or software resources) to join the SPR session as a supporting UE. In some examples, the peer UE may transmit a signal to the target UE including information indicative of a confirmation that the peer UE is capable of performing the CSA and/or the SPR measurements.

At operation 203, if the peer UE elects to join the SPR session as a supporting UE, the peer UE (now a supporting UE) performs CSA with the target UE based on the alignment information included in the request for CSA described above. For instance, the supporting UE may orient (e.g. rotate) its LCS to correspond in orientation to the LCS of the target UE. This may be such as to cause the supporting UE and target UE to share the same notion as to what an angle of arrival or angle of departure is with respect to a spatial direction. Put another way, the LCS of the supporting UE and the LCS of the target UE may, as a result of performing CSA, share a consistent local angular representation for use in reporting angle measurements.

Various aspects relating to such coordinate system alignment are described below with reference to FIG. 8.

In some examples, at operation 204, the supporting UE may send a reply to the SPR request. For instance, in some examples, the reply may include one or more of: an identifier (ID) associated with the supporting UE, a location of the supporting UE, a ranging capability of the supporting UE (e.g. but not limited to, the types of RCI that the supporting UE is capable of measuring), and/or a result of the CSA. For instance, the result of the CSA may comprise an indication of the extent to which the CSA was successful, and hence the extent to which angle measurements received from the supporting UE can be trusted. In such examples, the indication may sometimes be referred to as a 'trust level'. The result of the CSA may include an indication of an accuracy of the CSA (i.e. how well, or to what accuracy/precision the supporting UE expects to have realised the angular alignment of its LCS with that of the target UE). In some examples, such as those in which the reply includes a location of the supporting UE, the reply may further include a measure of location integrity (e.g. but not limited to a confidence and/or error metric) and/or a location source (such as GNSS, GPS, NR etc.). In some examples, the result of the CSA may be sent by the supporting UE to the target UE (e.g. via SL) separately from the reply to the SPR request. Operations 201 to 204 may together be referred to as a 'signalling handshake'.

In some examples, at operation 205, the target UE may send, to the supporting UE, signal(s) including information ("configuration information") for use in configuring a transceiver of the supporting UE to transmit and/or receive the SL-PRS. Such information may, for instance, include sequence, time, frequency and/or periodicity patterns.

In operation 206, the target UE transmits positioning references signals 206 (e.g. SL-PRS) to the supporting UE. In some examples, SL-PRS may be received via a transceiver configured using the information described with reference to operation 205.

At operation 207, the supporting UE receives transmitted SL-PRS 206 and may perform some or all of the requested SPR measurements as described with reference to operation 201.

At operation 208, the supporting UE transmits positioning reference signals (e.g. SL-PRS) to the target UE. In some examples, SL-PRS may be transmitted via a transceiver configured using the information described with reference to operation 205.

At operation 209, the target UE receives transmitted SL-PRS 208 and may perform some or all of the SPR measurements as described with reference to operation 201. Such measurements may be referred to as target UE measurements.

At operation 210, the supporting UE transmits signal(s) to the target UE which include information indicative of the SPR measurements performed by the supporting UE at operation 207.

In examples in which one or more neighbouring UEs 220 are present, the supporting UE may receive signal(s) 211 from neighbouring UEs 220. These signals may include information indicative of the locations of one or more reflectors in the environment that are known to the neighbouring UE 220 that sent the signals. Put another way, neighbouring UEs 220 may 'warn' the supporting UE as to the presence of reflectors visible to the neighbouring UEs 220. As will of course be appreciated, some, all or none of the reflectors included in such a 'warning' may be detectable using the measurements described with reference to operations 207 and 209. In some such examples, some or all of this information may be forwarded to target UE at operation 212. For instance, this may occur if the supporting UE deems this information relevant to the SPR process. For instance, the information may be forwarded if the signals received from the neighbouring UEs 220 are received with a similar power to that of the SL-PRS from the target, thereby to filter out information from distant neighbouring UEs 220. Moreover, the information may be forwarded if the neighbouring UE obstacle information is similar to the SL-PRS channel (e.g. if the neighbouring UE's obstacles have the same or similar directions to reflections of the SL-PRS from the target), thereby to filter out obstacles which are not in the field of view of the target UE.

Alternatively, the target UE may directly receive the signal(s) 211 from neighbouring UEs 220. These signals may include information indicative of the locations of one or more reflectors in the environment that are known to the neighbouring UE 220 that sent the signals. Put another way, neighbouring UEs 220 may 'warn' the target UE as to the presence of reflectors visible to the neighbouring UEs 220

In some examples, at operation 213, the target UE may compute a time of travel (TOT) for the link to the supporting UE based on the SPR measurements described with reference to operations 207 and 209. For instance, the TOT may be determined based on a time difference (TD) for the supporting UE together with a TD for the target UE. In some such examples, the TOT may be calculated as half of the difference between the TD as measured by the supporting UE and the TD as measured by the target UE.

In some examples, a location of the target UE may also be obtained. For instance the target UE may estimate its location by combining TOTs to multiple supporting UEs (e.g. but not limited to, using multilateration methods). In other examples, the target UE may estimate its own location using a positioning process which is not dependent on radio access technology (RAT). For instance, such a process may involve using a global navigation satellite system, GNSS, such as a global positioning system, GPS. In yet other examples, the target UE may obtain its position from the network (e.g. via a base station) as part of a RAT-dependent process.

At operation 214, the target UE time-aligns the supporting UE measurements with the target UE measurements. In some examples, this time-alignment may be based on the computed TOT. For instance, the target UE may offset the delay measurements performed by the supporting UE and the target UE (sometimes referred to as 'delay rasters') using offsets proportional to the computed TOT. Put another way, in some examples, time-aligning the supporting UE measurements with the target UE measurements may include determining a common delay-domain origin using the computed time of travel for the link between the target UE and the supporting UE. In some examples, such a common delay-domain origin may be determined as described with reference to FIG. 1.

At operation 215, the target UE may detect and validate reflectors using the time-aligned measurements. For instance, the time-aligned RCI measurements from the target UE and the supporting UE may be compared with one another. In this case, a particular reflector may be considered 'valid' if a channel tap (i.e. a component of the measured signal) is found in both the supporting UE measurements and the target UE measurements at approximately the same aligned delay. Put another way, at operation 215 the target UE may determine, based on the time-aligned measurements, an association between a component of the target UE measurements and at least one respective component of the supporting UE measurements. In this way, the associated components may be determined to correspond to a particular reflector in an environment of the target UE.

At operation 216, the target UE calculates a distance from the target UE to the reflector(s) detected/validated at operation 215. For instance, such a distance may be calculated based on the associated components determined to correspond to the reflector(s). In some examples, such a distance may be determined as described with reference to FIG. 1. In some examples, a distance from the supporting UE to the reflector(s) may also be calculated by performing a method similar to that described with respect to the target UE. In some examples, the distance from the supporting UE to the reflector(s) may be calculated using the formula $d_k(z)=d-d_k(0)$, where $d_k(z)$ is the distance from the supporting UE to the reflector k, $d_k(0)$ is the distance from the target UE to the reflector, and d is the path distance covered by signals corresponding to the $k^{th}$ component (i.e. $d=c \times aD(0,z)(k)$). In some examples, the target UE may determine a position of the particular reflector relative to the target UE based on the determined distance and an angle measurement for the corresponding component of the target UE measurements. For instance, in some examples, such a relative position may be indicated using polar coordinates. Alternatively, the target UE may obtain an absolute position of the particular reflector as $x0(k)=d_k(0) \cos(A(0,z)(k)) \pm x$ and $y0(k)=d_k(0) \sin(A(0,z)(k)) \pm y$.

In some examples, at operation 217, the target UE may transmit signal(s) to the supporting UE which include information indicative of the reflector location(s) determined at operation 216. In addition or alternatively, the signal(s) may include ranging information indicative of a distance between the supporting UE and the reflector(s).

In some examples, at operation 218, the supporting UE may transmit signal(s) to other neighbouring UEs 220 including information indicative of the determined locations of the reflectors. For instance, in some examples, the signal(s) transmitted at operation 218 may be similar to the signal(s) transmitted at operation 211 as described above. That is to say, having identified the locations of one or more reflectors in the vicinity of the target UE/supporting UE, the supporting UE may 'warn' neighbouring UEs 220 of the presence and locations of some or all of these reflectors (e.g. based on perceived relevance). In some examples, this transmission may be referred to as an 'obstacle warning SL multicast'.

Alternatively, the target UE may transmit signal(s) to other neighbouring UEs 220 including information indicative of the determined locations of the reflectors. That is to say, having identified the locations of one or more reflectors in the vicinity of the target UE/supporting UE, the target UE may 'warn' neighbouring UEs 220 of the presence and locations of some or all of these reflectors.

Figure 5:
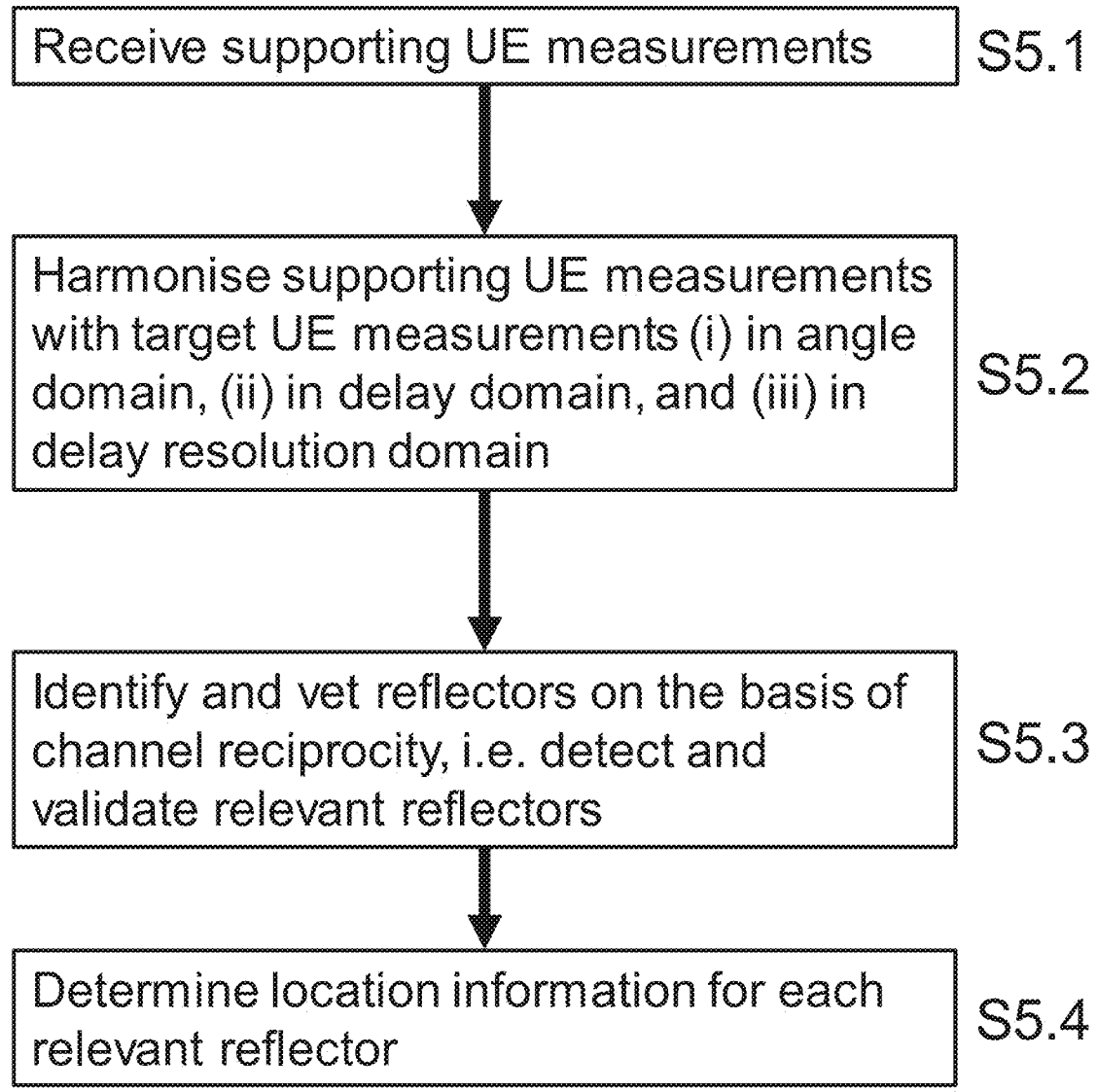

FIG. 5 is a flowchart depicting various operations which may be performed in accordance with various examples. For instance, the operations depicted in FIG. 5 may be executed by a UE device (such as target UE 100 described with reference to FIG. 1) or other suitable apparatus. As will of course be appreciated, various operations illustrated in FIG. 5 correspond to operations already described with reference to the previous Figures. In particular, in some examples, operation S5.1 may correspond to operation 210 described with reference to FIG. 2, operation S5.2 may correspond to operation 214, operation S5.3 may correspond to operation 215, and operation S5.4 may correspond to operation 216.

In operation S5.1, a target UE receives information indicative of measurements (e.g. but not limited to, RCI measurements) of signals transmitted from the target UE to one or more supporting UEs via a multipath communications channel, the measurements being performed by the one or more supporting UEs at which the signals were received. In some examples, the measurements performed by each of the one or more supporting UEs may include a channel periodogram and/or a CIR and/or a CFR. In addition or alternatively, the supporting UE measurements may include a list of components (i.e. 'taps') of the measured signals caused by propagation via the multipath communications channel. For instance, in some examples, components of the measured signals may correspond to signals received at the supporting UE via different paths (e.g. due to reflections caused by other objects in the vicinity). In some examples, the list of components may include angles of arrival, propagation delays, and/or powers (i.e. gains) for each component. In some examples, the supporting UE measurements may further include information characterising the components in the frequency domain.

In operation S5.2, the target UE 'harmonises' the supporting UE measurements with corresponding target UE measurements of signals transmitted from the one or more supporting UEs to the target UE via the multipath communications channel, as described with reference to the previous Figures. For instance, the target UE may align channel rasters among the UEs by (i) determining a common coordinate system for each pair of UEs (e.g. by orienting the LCSs of the one or more supporting UEs to correspond in orientation to the LCS of the target UE), (ii) determining a common delay-domain origin (i.e. reference point for the channel response in the delay domain) for each pair of UEs, and (iii) harmonising the different resolutions (in the delay domain) across the sets of measurements.

Figure 4:
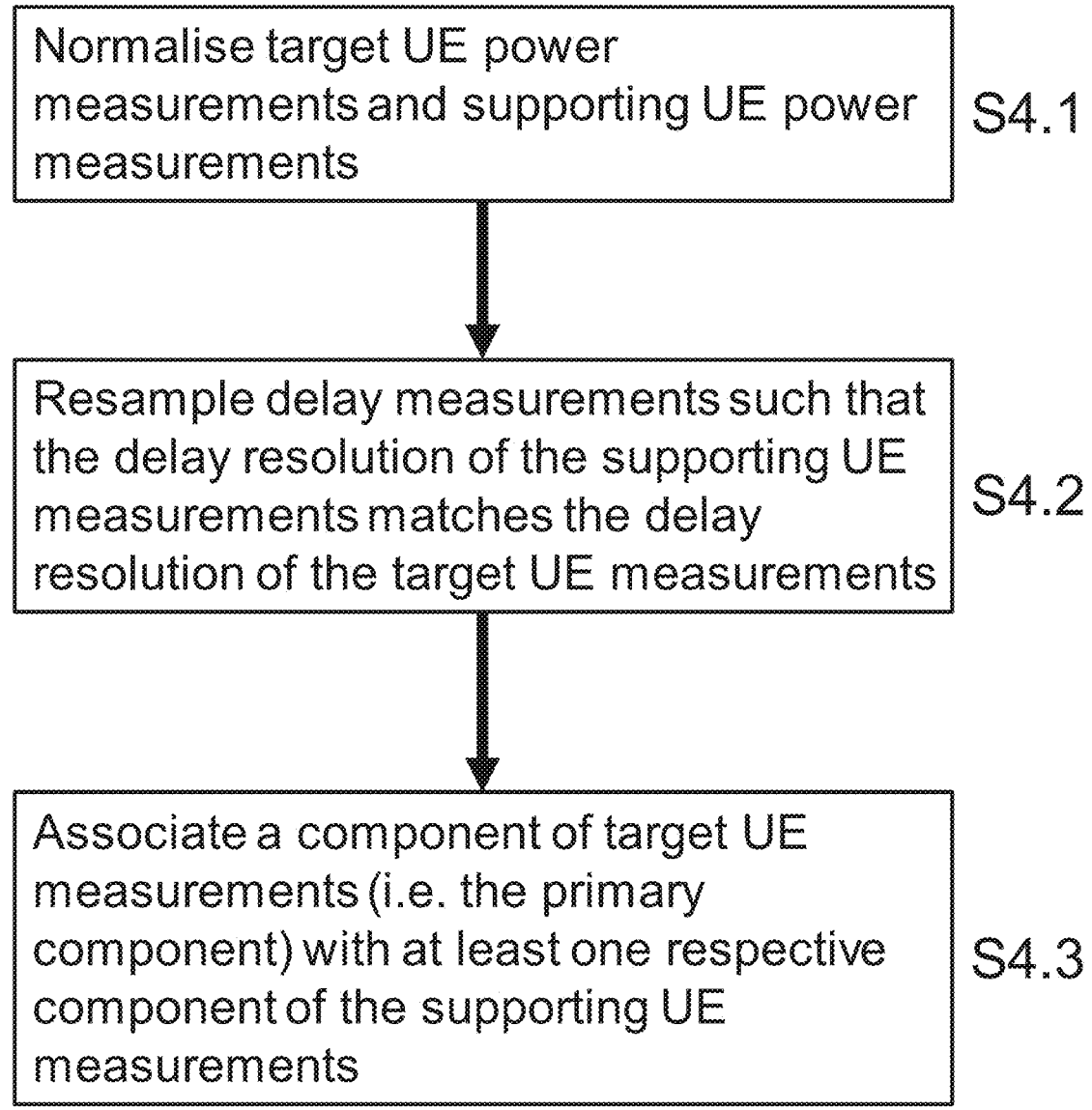

This 'harmonisation' process has been described further with reference to FIGS. 3 and 4 above.

In operation S5.3, the target UE may perform an identification and vetting (also referred to as detection and validation) of reflectors based on channel reciprocity for each pair of UEs (or, more generally, for each set of UEs). Put another way, the target UE may determine an association between each component of the target UE measurements and at least one respective component of the supporting UE measurements. In such examples, the associated components correspond to reflectors which are common to the target UE measurements and the supporting UE measurements, and may be determined to represent 'validated' (i.e. 'real') reflectors in the vicinity of the target UE. In some such examples, this procedure may incorporate information from multiple supporting UEs. For instance, information from multiple UEs may be used in a 'cold started' or 'warm started' combination process as described with reference to FIG. 1.

Various examples of detection and validation of reflectors are described further with reference to FIGS. 6 and 7 below.

In operation S5.4, the target UE may determine location information for the reflectors identified in operation S5.3. For instance, in some examples, the target UE may determine a distance (sometimes referred to as a 'range') to each of the identified reflectors. In particular, a distance from the target UE to a particular reflector may be determined based on the associated components of the UE measurements. In some examples, the target UE may determine a position of the reflector(s) relative to the target UE based on the determined range and an angle measurement for the corresponding component of the target UE measurements. For instance, in some examples, such a relative position may be indicated using polar coordinates. In some examples, the target UE may combine such a determined relative position with a position of the target UE (e.g. obtained suing GNSS or RAT-based procedures) so as to obtain an absolute position of particular reflector.

Figure 6:
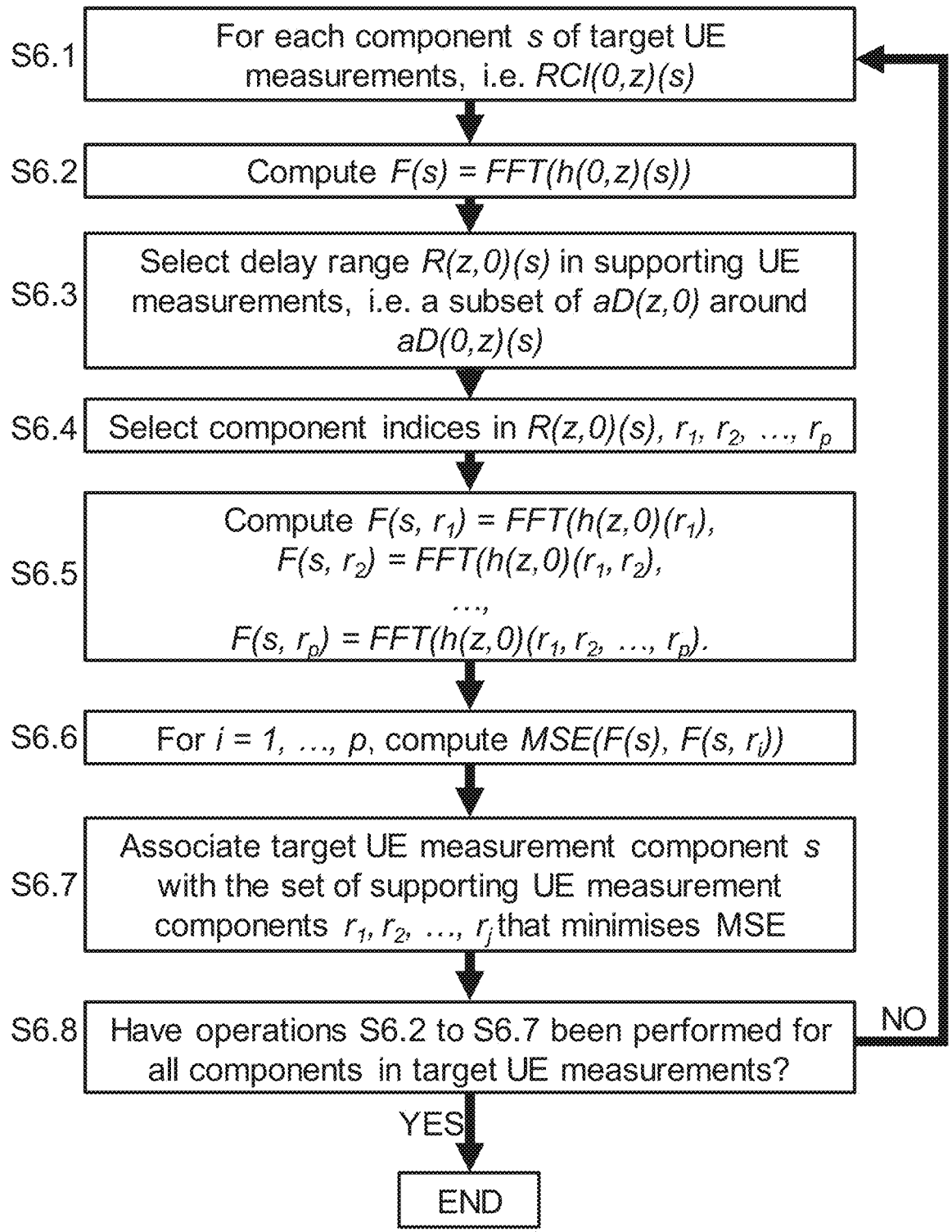

FIG. 6 is a flowchart depicting various operations which may be performed in accordance with various examples. For instance, the operations depicted in FIG. 6 may be executed by a UE device or other suitable apparatus. As will of course be appreciated, various operations illustrated in FIG. 6 correspond to operations already described with reference to the previous Figures. For instance, all the operations depicted in FIG. 6 may be performed as part of operation S4.3 of FIG. 4, part of operation S5.3 of FIG. 3 or part of operation 215 in FIG. 2.

In general terms, the operations depicted in FIG. 6 relate to determining that a component of the target UE measurements is associated with at least one respective component of the supporting UE measurements based on a minimisation of a divergence metric between the component of the target UE measurements and one or more subsets of components of the supporting UE measurements. For instance, the at least one respective component of the supporting UE measurements may be selected as the subset of the one or more subsets which minimises the divergence metric.

In operation S6.1, the operations described with reference to operations S6.2 to S6.8 are iterated over the components of the target UE measurements. Put another way, for each component s of the target UE measurements, the operations described with reference to operations S6.2 to S6.8 may be performed. In some examples, the target UE measurement component s considered in each iteration may be referred to as the 'primary component'.

In operation S6.2, a discrete Fourier transform (e.g. but not limited to, a Fast Fourier Transform, FFT) of a channel impulse response corresponding to the component s may be determined. For instance, if the channel impulse response corresponding to component s is given by $h(o,z)(s)$, then its Fourier transform may be given by $F(s)=FFT(h(o,z)(s))$.

In operation S6.3, a delay range $R(z,o)(s)$ may be selected from the supporting UE measurements. Put another way, a subset of the time-aligned supporting UE delay measurements $aD(z,o)$ may be selected, the subset being such that the delay of component s (i.e. $aD(o,z)(s)$) lies within its range. In some examples, the range $R(z,o)(s)$ may be identified as an interval of fixed width centred on $aD(o,z)(s)$. Alternatively, $R(z,o)(s)$ may be selected as an interval that holds a fixed proportion of the total channel energy (e.g. but not limited to, 80% of the channel energy).

In operation S6.4, the components of the supporting UE measurements which lie within range R(z,o)(s) may be indexed as $r_1, r_2, \ldots, r_p$, where p is the total number of such components. In some examples, the components $r_1, r_2, \ldots, r_p$ may be indexed in order of ascending delays. Alternatively, the components $r_1, r_2, \ldots, r_p$ may be indexed in order of ascending distance from component s in the delay domain.

In operation S6.5, discrete Fourier transforms of one or more channel impulse responses corresponding to subsets of components $r_1, r_2, \ldots, r_p$ may be computed. For instance, an FFT of a channel impulse response corresponding to component r, may be computed, followed by an FFT of a channel impulse response corresponding to components $r_1$ and $r_2$ etc. In such examples, if the channel impulse response corresponding to components $r_1$ to $r_q$ is given by $h(z,o)(r_1, \ldots, r_q)$, then the Fourier transforms may be given by $F(s,r_1)=FFT(h(z,o)(r_1)), F(s,r_2)=FFT(h(z,o)(r_1, r_2)), \ldots, F(s, r_p)=FFT(h(z,o)(r_1, r_2, \ldots, r_p))$. Put another way, the FFT may be progressively applied to a channel impulse response corresponding to the first q components, for $q=1, 2, \ldots, p$.

In operation S6.6, a divergence metric may be evaluated between the Fourier transform of the channel impulse response corresponding to the component s (as determined at operation S6.2) and each of the Fourier transforms of the channel impulse responses corresponding to subsets of components $r_1, r_2, \ldots, r_p$ (as computed at operation S6.5). In some examples, the divergence metric may be the mean squared error, MSE. Put another way, for $i=1, \ldots, p$, the $MSE(F(s), F(s, r_i))$ may be computed.

In operation S6.7, component s (i.e. the primary component) may be associated with the set of supporting UE measurement components $r_1, r_2, \ldots, r_j$ that minimises the divergence metric. The components $r_1, r_2, \ldots, r_j$ are then removed from a search list (i.e. the components of the supporting UE measurements from which the delay range is selected/indexed at operations S6.3 and S6.4).

In operation S6.8, the method terminates if each of the components of the target UE measurements have been iterated over as described above, returning an association between each of the components of the target UE measurements with one or more respective components of the supporting UE measurements. Otherwise, the method returns to operation S6.1 and the next component of the target UE measurements may be processed.

Figure 7:
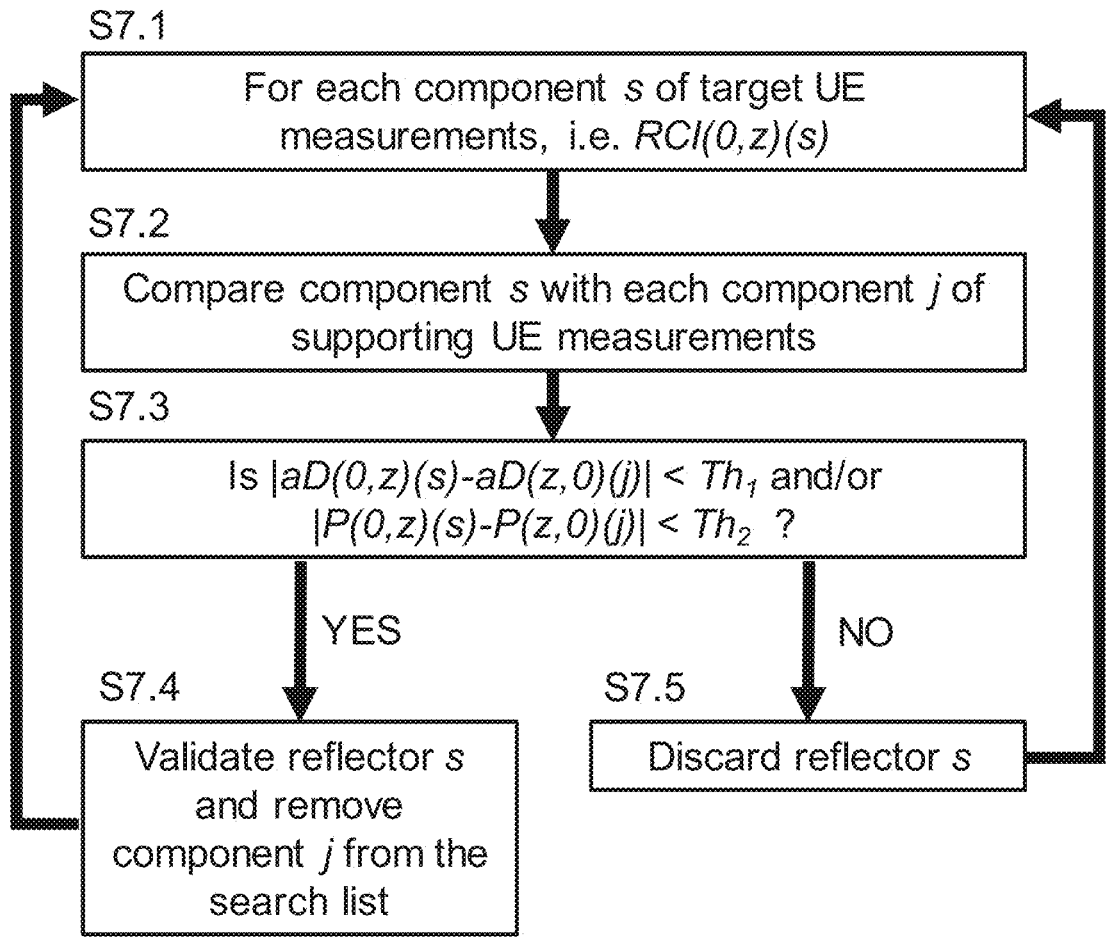

FIG. 7 is a flowchart depicting various operations which may be performed in accordance with various examples. For instance, the operations depicted in FIG. 7 may be executed by a UE device or other suitable apparatus. As will of course be appreciated, various operations illustrated in FIG. 7 correspond to operations already described with reference to the previous Figures. For instance, all the operations depicted in FIG. 7 may be performed as part of operation S4.3 of FIG. 4, part of operation S5.3 of FIG. 3 or part of operation 215 in FIG. 2.

In some examples, instead of performing the operations described with reference to FIG. 6, each of the components of the target UE measurements may be associated with a single corresponding component of the supporting UE measurements in the manner described with reference to FIG. 7. In general terms, the operations depicted in FIG. 7 relate to determining that a component of the target UE measurements is associated with at least one respective component of the supporting UE measurements based on a delay measurement of the component of the target UE measurement being within a threshold delay of a delay measurement of the at least one respective component of the supporting UE measurements and/or based on a power measurement of the component of the target UE measurement being within a power threshold of a power measurement of the at least one respective component of the supporting UE measurements.

In operation S7.1, the operations described with reference to operations S7.2 to S7.5 may be iterated over the components of the target UE measurements. Put another way, for each component s of the target UE measurements, the operations described with reference to operations S7.2 to S7.5 may be performed. In some examples, the target UE measurement component s considered in each iteration may be referred to as the 'primary component'.

In operation S7.2, component s of the target UE measurements may be compared with the components of the supporting UE measurements. For instance, the (time-aligned) delay and/or power of the primary component may be compared with the respective delay/power of each component j of the supporting UE measurements.

In operation S7.3, based on the comparison, it may be determined whether the compared measurements meet one or more thresholds. If the one or more thresholds are determined to be met, the method proceeds to operation S7.4. Otherwise, the method proceeds to operation S7.5. For instance, the one or more thresholds may be determined to be met if a delay measurement of one or more components of the supporting UE measurements is within a delay threshold of the delay of the component s of the target UE measurements (i.e. $|aD(o,z)(s)-aD(z,o)(j)|<Th_1$). In other examples, the one or more thresholds may be determined to be met if a power measurement of one or more components of the supporting UE measurements is within a power threshold of the power of the component s of the target UE measurements (i.e. $|P(o,z)(s)-P(z,o)(j)|<Th_2$). In yet other examples, the one or more thresholds may only be determined to be met if both the power and delay thresholds are satisfied (i.e. $|aD(o,z)(s)-aD(z,o)(j)|<Th_1$ and $|P(o,z)(s)-P(z,o)(j)|<Th_2$).

In operation S7.4, component s may be validated as a 'real' reflector, and the one or more components j of the supporting UE measurements which were determined to meet the one or more thresholds in operation S7.3 are removed from a search list (i.e. the components of the supporting UE measurements which are compared with the primary component in subsequent iterations at operation S7.2).

In operation S7.5, component s may be discarded. That is to say, no corresponding reflections have been identified in the supporting UE measurements (i.e. the reciprocal channel) and so the component s is unlikely to correspond to a 'real' reflector in the environment of the target UE.

After performance of operation S7.4 or S7.5, the method returns to operation S7.1 and the next component of the target UE measurements may be processed.

FIG. 8 depicts UE measurements together with time-aligned UE measurements as described with reference to the previous Figures. The UE measurements and the time-aligned UE measurements may include delay, D, angle of arrival, A, and power, P, measurements of signals transmitted between a target UE, such as UE 100, and a supporting UE, such as UE 110, via a multipath communications channel. Target UE measurements are depicted on axes indicated generally by the reference numeral 810 (on the top-left of FIG. 8). By way of example only, target UE measurements include a first component 811, second component 812, third component 813 and fourth component 814, ordered by increasing delays. As will of course be appreciated, each of components 811 to 814 may be represented by the triplet D(o,z)(i), A(o,z)(i), P(o,z)(i), where i runs from 1 to 4. Similarly, supporting UE measurements are depicted on axes indicated generally by the reference numeral 820 (on the bottom-left of FIG. 8), and include components 821 to 824.

Reference line 801 serves to illustrate how the delay rasters of the target UE measurements and supporting UE measurements are misaligned. That is to say, the first (i.e. line of sight, LoS) component 811 of the target UE measurements 810 is not aligned with the first (i.e. LoS) component 821 of the supporting UE measurements.

As described above, target UE may time-align the supporting UE measurements with the target UE measurements. For instance, a common delay-domain origin may be determined using a time of travel (TOT) for the link between the target UE and the supporting UE. For example, the target UE may calculate 'aligned' delay rasters as aD(0,z)=D(0,z)−dTOT(0,z) and aD(z,0)=D(z,0)−dTOT(z,0), where dTOT is an RCI-specific offset determined as described with reference to the previous Figures (in particular FIG. 3).

By way of example only, time-aligned target UE measurements are depicted on axes indicated generally by the reference numeral 830 (top-right of FIG. 8), and include components 831 to 834, and time-aligned supporting UE measurements are depicted on axes indicated generally by the reference numeral 840 (both-right of FIG. 8), and include components 841 to 844. As a result of the time-alignment, the delay raster of the target UE measurements may be aligned with that of the supporting UE measurements. This is apparent from reference line 801, which illustrated as aligned in the time domain with both the first component 831 of the time-aligned target UE measurements and the first component 841 of the time-aligned supporting UE measurements.

Figure 9:
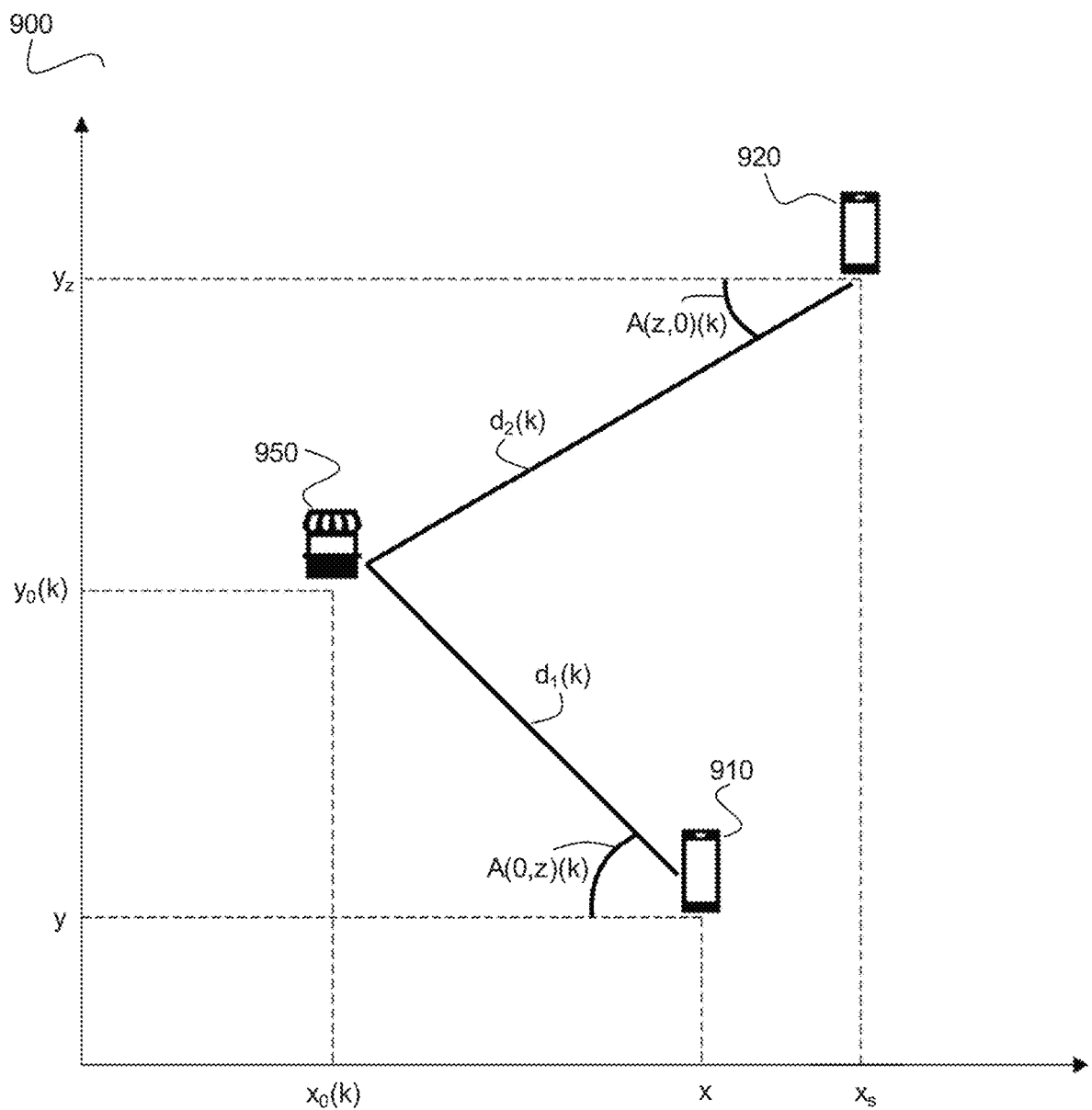
FIG. 9 is an example illustrating communications between a target UE and a supporting UE.

FIG. 9 depicts a target UE 910, a supporting UE 920 and reflector 950 on axes indicated generally by the reference numeral 900. As will of course be appreciated, aspects of FIG. 9 may correspond to aspects described with reference to the previous Figures. In particular, target UE 910 may correspond to target UE 100, supporting UE 920 may correspond to supporting UE 110, and reflector 950 may correspond to particular reflector 150.

As described above, location information for the particular reflector 950 may be determined based on associated components of time-aligned UE measurements. In some examples, the location information may be or may comprise a distance between target UE 910 and the reflector. In FIG. 9, the distance between target UE 910 and the reflector is indicated as $d_1(k)$, while the distance between supporting UE 920 and reflector 950 is indicated as $d_2(k)$, where component k of the associated measurements corresponds to reflector 1050. In this case, $d_1(k)+d_2(k)=d$, where $d=c \times aD(0,z)(k)$ is the path distance covered by signals corresponding to the $k^{th}$ component. In FIG. 9, the location of target UE 910 is denoted (x, y), the location of reflector 950 is denoted $(x_o(k), y_o(k))$, and the location of supporting UE 920 is denoted $(x_z, y_z)$.

As described above, the distance between target UE 910 and reflector 950 may be given by the following:

$$d_1(k) = \frac{|y_z - y| - d \sin(A(z,0)(k))}{\sin(A(z,0)(k)) + \sin(A(0,z)(k))},$$

where A(z,o)(k) is the angle of arrival measurement of the $k^{th}$ component of the supporting UE measurements and A(o,z)(k) is the angle of arrival measurement of the $k^{th}$ component of the target UE measurements.

By way of example only, FIG. 9 depicts A(o,z)(k) as approximately equal to 45 degrees, and A(z,o)(k) as approximately equal to negative 30 degrees (this angle is negative because the LCS of supporting UE 920 has been oriented to correspond to the LCS of target UE 910), though it will of course be appreciated that different relative positions of target UE 910, supporting UE 920 and reflector 950 are possible.

Although the distance between supporting UE 920 and reflector 950 may be determined using $d_1(k)+d_2(k)=d$, it may also be computed in a manner similar to that used to calculate the distance between target UE 910 and reflector 950.

FIG. 10 is a flowchart depicting various operations which may be performed in accordance with various examples. For instance, the operations depicted in FIG. 10 may be executed by a UE device or other suitable apparatus. As will of course be appreciated, various operations illustrated in FIG. 10 correspond to operations already described with reference to the previous Figures.

In operation S10.1, a target UE receives a signal including information indicative of supporting UE measurements of signals transmitted from the target UE to a supporting UE via a multipath communications channel, the supporting UE measurements including delay and angle measurements of the signals transmitted from the target UE to the supporting UE via the multipath communications channel. As will be appreciated, operation S10.1 may correspond to at least operation 210 of FIG. 2 and/or operation S5.1 of FIG. 3.

In operation S10.2, the supporting UE measurements are time-aligned with target UE measurements of signals transmitted from the supporting UE to the target UE via the multipath communications channel, the target UE measurements including delay and angle measurements for the signals transmitted from the supporting UE to the target UE via the multipath communications channel. As will be appreciated, operation S10.2 may correspond to at least operation 214 of FIG. 2, operation S5.2 of FIG. 3, and/or operation S3.3 of FIG. 3.

In operation S10.3, an association between a component of the target UE measurements and at least one respective component of the supporting UE measurements is determined based on the time-aligned measurements, wherein the associated components are determined to correspond to a particular reflector in an environment of the target UE. As will be appreciated, operation S10.3 may correspond to at least operation 215 of FIG. 2, operation S5.3 of FIG. 3, operation S4.3 of FIG. 4, a combination of operations S6.1 to S6.8 of FIG. 6, and/or a combination of operations S7.1 to S7.5 of FIG. 7.

In operation S10.4, location information for the particular reflector is determined based on the associated components. As will be appreciated, operation S10.4 may correspond to at least operation 216 of FIG. 2, and/or operation S5.4 of FIG. 3. The location information may include at least one of: a distance and/or angle from the target UE to the particular reflector; a distance and/or angle from the supporting UE to the particular reflector; a distance and/or angle from a neighbouring UE to the particular reflector; a position of the particular reflector with respect to a local coordinate system, LCS, of the target UE, the supporting UE, and/or a neighbouring UE; and/or a position of the particular reflector with respect to a global coordinate system, GCS.

Figure 11:
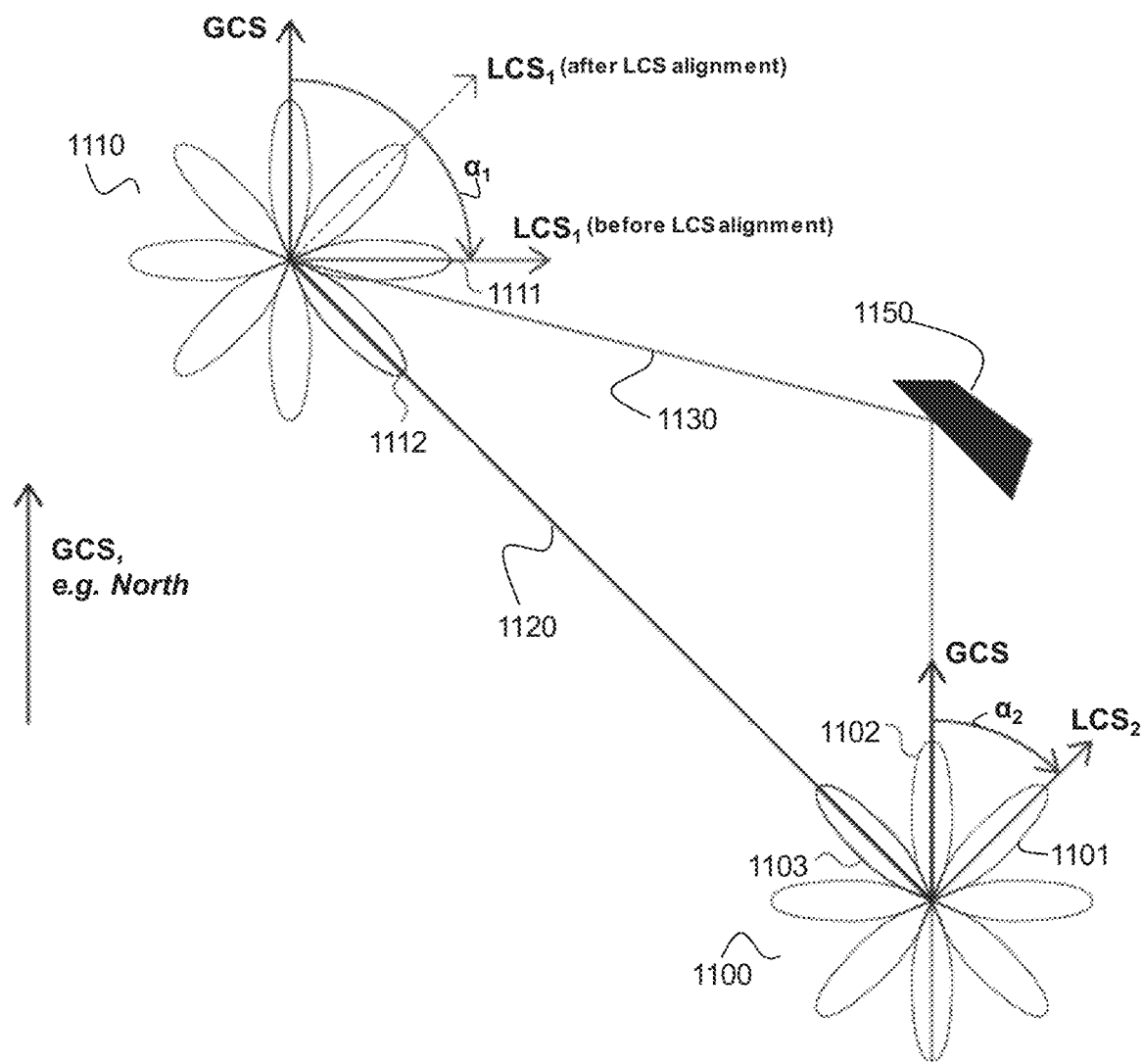
FIG. 11 is an example illustrating example beam arrangements of a target UE and a supporting UE.

FIG. 11 depicts example beam arrangements for a first terminal device 1110 (referred to as "first UE" 1110) and a second terminal device 1100 (referred to as "second UE") in the vicinity of reflector 1150. As will of course be appreciated, second UE 1100 may correspond to at least target UE 100, first UE 1110 may correspond to at least supporting UE 110, and reflector 1150 may correspond to at least particular reflector 150 described with reference to FIGS. 1 to 10. FIG. 11 will be described in conjunction with FIG. 12, which is a flowchart depicting various operations which may be performed in accordance with various examples. For instance, the operations depicted in FIG. 12 may be executed by a UE device or other suitable apparatus. As will of course be appreciated and as discussed further below, various operations illustrated in FIG. 12 correspond to operations already described with reference to the previous Figures.

As described with reference to the previous Figures, a UE may cause its local coordinate system (LCS) to be aligned with the LCS of another UE. Whilst, in some examples, a supporting UE may be caused to align its LCS with that of a target UE, as mentioned above, it will be appreciated that such alignment may be performed between any pair of UEs (or, more generally, any plurality of UEs). For instance, in some examples, a target UE may be caused to align its LCS with that of a supporting UE. Such alignment as described herein may be referred to as 'coordinate system alignment' (CSA) or 'angle domain synchronisation' and may be such as to cause the UEs to share the same notion as to what an angle of arrival or departure is with respect to a spatial direction.

At operation 12.1, alignment information is received at a first UE 1110 (e.g. a supporting UE) from a second UE 1100 (e.g. a target UE), for use by first UE 1110 in orienting a local coordinate system, LCS, of first UE 1110 (henceforth referred to as 'LCS$_1$') to correspond in orientation to an LCS of second UE 1100 (henceforth referred to as 'LCS$_2$'). As described above with reference to FIG. 2, the alignment information may be included in a request for CSA transmitted over a SL connection from second UE 1100 to first UE 1110. In some examples, the request for CSA may be part of a request for SPR measurements transmitted from second UE 1100. Alternatively, the request for CSA and the SPR measurements may be transmitted to first UE 1110 via separate signals transmitted from second UE 1100. As will be appreciated, operation S12.1 may in some implementations correspond at least in part to operation 201 described with reference to FIG. 2.

At operation S12.2, first UE 1110 may orient (e.g. rotate) its local coordinate system (LCS$_1$) to correspond in orientation to the LCS (LCS$_2$) of second UE 1100 based on the alignment information received at first UE 1110. In other words, the alignment information shared between the two UEs is such that they are able to align their coordinate systems to reach a common reference. In this way, it is possible for second UE 1100 and first UE 1110 to share the same notion of what an angle (e.g. but not limited to, an angle of departure or angle of arrival) is with respect to a spatial direction. Put another way, as a result of the orientation, angular information at second UE 1100 has the same meaning as at first UE 1110. As will be appreciated, operation S12.2 may correspond operation 203 of FIG. 2.

Whilst, by way of example only, the Figures are two-dimensional, it will of course be appreciated that the angular information contemplated herein may comprise azimuthal and zenith components. For instance, angle of arrival measurements at first UE 1110 may comprise an azimuth angle of arrival and/or a zenith angle of arrival for a given receive beam, whilst the angle of departure measurements at second UE 1100 may comprise an azimuth angle of departure and/or a zenith angle of departure for a given transmit beam.

In some examples, operation S12.2 may be performed in response to reception, at first UE 1110 from second UE 1100, of a request to orient LCS$_1$ to correspond in orientation to LCS$_2$. In addition or alternatively, first UE 1110 may transmit to second UE 1100 an indication that first UE 1110 is capable of orienting LCS$_1$ to correspond in orientation to LCS$_2$. For instance, this may occur before or after performing the orientation of operation S12.2, and may correspond to the confirmation described with reference to operation 202 of FIG. 2.

Having performed the orientation, the first UE 1110 may then, at operation S12.3, determine, using the oriented LCS of first UE 1110, angle of arrival (AoA) measurements of sidelink signals transmitted from second UE 1100 to first UE 1110 via a multipath communications channel for use in determining location information for at least one reflector in an environment of the first and second UEs. For instance, the angle of arrival measurements may include measurements of sidelink signals transmitted via a line of sight (LoS) path 1120 and/or paths other than the line of sight path, such as non-LoS path 1130 (e.g. via transmit beam 1102 and reflector 1150). In some examples the first UE may further determine delay and/or power measurements of the signals transmitted from second UE 1100 to first UE 1110 via the multipath communications channel. It will of course be appreciated that such measurements may correspond to those described with reference to the previous Figures, such as those performed at operation 207 of FIG. 2, and/or those received at operation S5.1 of FIG. 5.

At operation S12.4, first UE 1110 transmits to second UE 1100 information indicative of the determined angle of arrival measurements for use in determining location information for a reflector in an environment of second UE 1100. It will of course be appreciated that such location information for the reflector may be determined as described with reference to the previous Figures. For instance, operation S12.4 may in some implementations correspond to operation 210 of FIG. 2.

In some examples, the alignment information included in the signal received at first UE 1110 from second UE 1100 may be indicative of an orientation of LCS$_2$ with respect to a global coordinate system (GCS). For instance, the GCS may correspond to a spatial reference direction (e.g. North), and may be pre-agreed between the UEs (e.g. as part of a standard). In some examples, LCS$_1$ may be oriented to correspond to LCS$_2$ in orientation by orienting (e.g. rotating) LCS$_1$ such that an orientation of LCS$_1$ with respect to the GCS corresponds to the orientation of LCS$_2$ with respect to the GCS indicated by the alignment information. As will of course be appreciated, the orientation of LCSs with respect to the GCS may be determined via various means, such as, but not limited to, using a magnetometer, compass circuitry, inertial measurement unit (IMU), or other suitable means included in the supporting UE device.

In FIG. 11, the orientation of LCS$_1$ (before performance of CSA alignment as described herein) with respect to the GCS is denoted by $\alpha_1$ and the orientation of LCS$_2$ with respect to the GCS is denoted by $\alpha_2$. As such, in some examples, a value of $\alpha_2$ may be included in the alignment information. In such examples, first UE may be caused to orient itself such that $\alpha_1$ is equal to $\alpha_2$.

Alternatively, first UE 1110 may make use of the fact that a line of sight receive beam of first UE 1110 is anti-aligned with a line of sight transmit beam of the second UE 1100. In this case, the term anti-aligned refers to beams whose main lobes lie in the same line but have opposite directions. More generally, first UE 1110 may determine based on the received alignment information, an orientation of a particular transmit beam 1103 of second UE 1100 with respect to the $LCS_2$, wherein sidelink signals transmitted via the particular transmit beam 1103 of second UE 1100 along a LoS path 1120 of the multipath communication channel are received via a particular receive beam 1112 of first UE 1110. In such examples, first UE 1110 may orient $LCS_1$ such that an orientation of particular receive beam 1112 with respect to $LCS_1$ is anti-aligned with the determined orientation of particular transmit beam 1103 with respect to $LCS_2$ (i.e. the orientations differ by 180°, sometimes referred to as 'reciprocal' angles). In this way, alignment of $LCS_1$ with $LCS_2$ may be achieved without the need for a magnetometer and/or compass circuitry (or similar means for determining orientation with respect to a GCS). For instance, the orientation of particular transmit beam 1103 of second UE 1100 may comprise an angle of departure with respect to $LCS_2$ for signals transmitted via particular transmit beam 1103 of second UE 1100 (e.g. as determined by UE 1110 or reported by second UE 100), and the orientation of particular receive beam 1112 of first UE 1110 may comprise an angle of arrival with respect to $LCS_1$ of signals received at particular receive beam 1112 via the LoS path 1120.

In some examples, particular transmit beam 1103 may be referred to as a line of sight transmit beam of second UE 1100, and particular receive beam 1112 may be referred to as a line of sight receive beam of first UE 1110.

In some examples, particular receive beam 1112 (e.g. LoS receive beam of first UE 1110) may be identified from among a plurality of receive beams of first UE 1110 based on measurements of sidelink signals received at the plurality of receive beams from target UE 1100 via the multipath communications channel. For instance, particular receive beam 1112 may be identified as being a receive beam among the plurality of receive beams of first UE 1110 having a highest reference signal received power, RSRP, and/or an earliest time of arrival for sidelink signals transmitted from second UE 1100 via the multipath communications channel and received via the plurality of receive beams of first UE 1110.

On the other hand, sidelink signals propagated via paths other than LoS path 1120, such as path 1130, may be received at beams other than particular receive beam 1112. For instance, receive beam 1111 may have a lower RSRP and/or later time of arrival as compared to particular receive beam 1112. In some examples, such beams may be referred to as non-line of sight (NLoS) receive beams.

As described above, second UE 1100 may provide alignment information to the first UE, thereby to allow determination of an orientation of at least one transmit beam of the second UE with respect to $LCS_2$ for use in orienting $LCS_1$. For instance, the alignment information may be indicative of orientations with respect to $LCS_2$ of one or more respective transmit beams via which sidelink signals are transmitted by the second UE 1100.

In addition or alternatively, the alignment information may be indicative of identifiers of one or more respective transmit beams via which sidelink signals are transmitted by the second UE 1100 (e.g., by means of TCI states associated with the transmitted sidelink signals). In some examples, these identifiers may be referred to as 'beam identifiers'.

In addition or alternatively, the alignment information may be indicative of characteristics of sidelink signals transmitted by the second UE 1100 via one or more respective transmit beams having respective orientations with respect to $LCS_2$. In some such examples, the characteristics may comprise characteristics of data sequences used for encoding the respective sidelink signals (e.g., initialization sequence for a Gold sequence, or root index and cyclic shift for a ZC sequence) and/or time/frequency resources used for transmitting the respective sidelink signals (e.g., slot index/offset, symbol index/offset, symbol length/duration, time periodicity, frequency allocation).

In addition or alternatively, the alignment information may be indicative of one or more parameter values of a parametric model used at the first UE 1110 to determine characteristics of sidelink signals transmitted by the second UE 1100 via one or more respective transmit beams having respective orientations with respect to $LCS_2$. In some such examples, the one or more parameter values of the parametric model may comprise at least one of an azimuth angular interval between adjacent transmit beams of the second terminal device; a zenith angular interval between adjacent transmit beams of the second terminal device; an azimuth oversampling factor; and a zenith oversampling factor.

In some examples, the alignment information provided to the first UE may be indicative of one or a combination of the types of alignment information described above. In some examples, this alignment information may amount to 'explicit' orientation (i.e. angle of departure) information for at least one transmit beam of the second UE with respect to $LCS_2$ for use in orienting $LCS_1$. Alternatively, the alignment information may be 'implicit' information from which the orientations of transmit beams of the second UE 1100 can be determined.

For instance, in the 'explicit' case, the alignment information may be indicative of orientations for all or a subset (e.g. based on a velocity/direction of second UE 1100) of the transmit beams of the second UE 1100. In some such examples, the alignment information may include an explicit mapping (e.g. a table or function) between orientations of the transmit beams (i.e. angles of departure) of the second UE and information that allows sidelink signals received at first UE 1110 to be identified as having been transmitted from a specific transmit beam of the second UE 1100, such as the above-described beam identifiers or sidelink signal characteristics indicated by the alignment information.

In some examples, the first UE 1110 may determine that at least one sidelink signal received at the particular receive beam 1112 of the first UE matches a particular beam identifier or sidelink signal characteristic from among those indicated by the received alignment information. In this case, an orientation of the particular transmit beam 1103 (e.g. LoS transmit beam) with respect to $LCS_2$ is then determined to be an orientation from the one or more orientations of the transmit beams of the second UE which corresponds to the particular beam identifier or sidelink signal characteristic. For instance, the corresponding orientation may be determined using the explicit mapping between beam orientations and beam identifiers/signal characteristics included in the alignment information.

In the 'implicit case', the alignment information provided to the first UE 1110 by the second UE 1100 may further include information for use in determining transmit beam orientations with respect to $LCS_2$, transmit beam identifiers, and/or characteristics of sidelink signals transmitted by the second UE 1100. In this way, rather than the alignment information providing an explicit mapping between transmit beam orientations and beam identifiers/sidelink signal characteristics, the first UE may be able to use the alignment information to infer beam orientations, beam identifiers and/or signal characteristics for sidelink signals transmitted from the second UE via the multipath communication channel. As in the explicit case, received signals may be matched with the inferred beam identifiers and/or signal characteristics to establish their angle of departure.

For instance, as described above, the alignment information may further include one or more parameter values of a parametric model used at the first UE 1110 to determine characteristics of sidelink signals transmitted by the second UE 1100 via one or more respective transmit beams having respective orientations with respect to the LCS of the second UE 1100. It will be appreciated that, not only may such a parametric model be used at the first UE to determine characteristics of sidelink signals received from the second UE, but it may also be used at the second UE in the generation of such sidelink signals (e.g. but not limited to, SL-PRS).

As described above, in some examples, the one or more parameter values may include information for use in generating SL-PRS sequences (e.g. initialisation data for Gold sequences, root sequence index and cyclic shift values for ZC sequences), and/or time/frequency resources (e.g. slot offset, symbol offset, frequency offset) for use based on the angle or beam index of the transmit beam.

Put another way, in the implicit case, the first UE may use the alignment information to determine one or more additional orientations of transmit beams of the second UE, and/or one or more corresponding additional beam identifiers/sidelink signal characteristics. The first UE 1110 may then determine that at least one sidelink signal received at the particular receive beam 1112 of the first UE matches a particular beam identifier/sidelink signal characteristic of the one or more additional transmit beam identifiers/sidelink signal characteristics. As such, the orientation of the particular transmit beam 1103 of second UE 1100 with respect to the $LCS_2$ may then be determined to be an orientation from among the one or more additional orientations of transmit beams of the second UE 1100 which corresponds to the particular beam identifier/sidelink signal characteristic.

In some examples, the one or more additional orientations with respect to $LCS_2$ may be determined based on an orientation of at least one transmit beam of the second UE included in the alignment information (e.g. but not limited to, 'zero-angle' transmit beam 1102) using one or more of: a transmit beam azimuth interval, a transmit beam zenith interval, an azimuth oversampling factor, and/or a zenith oversampling factor.

In some examples, the one or more corresponding additional transmit beam identifiers may be determined based on the one or more additional orientations and/or one or more parameter values used for generating signals at the second UE 1100 for transmission to the first UE via the multipath communications channel.

In addition or alternatively, the alignment information may include transmit beam pattern information. For instance, the transmit beam pattern information may define an angular separation at the second UE side between adjacent transmit beams. This information may then be used by first UE 1110 in combination with beam-specific measurements performed at the first UE 1110 to estimate the AoD at the second UE 1200. In some examples, such transmit beam pattern information may be used in the 'implicit' case described above. For instance, the first UE may make use of a mapping between beam index and orientation with respect to $LCS_2$ for a reference beam (e.g. the zero angle beam 1102), and a function that describes how the orientation of any of the remaining beams may be computed using the index of the remaining beam, the index of the reference beam, and transmit beam pattern information such as the beam width. It will be appreciated that the mapping/function used in this process may be included in the alignment information or be pre-stored at the first UE.

For instance, and referring to FIG. 11, transmit beam 1103 may be the 90° beam with respect to $LCS_2$ of second UE 1100, transmit beam 1102 may be the 45° beam with respect to $LCS_2$ of second UE 1100, and transmit beam 1101 may be the 0° beam with respect to $LCS_2$ of second UE 1100 (in this example, positive angles are counterclockwise by convention). Similarly, before alignment of $LCS_1$ of first UE 1110 with $LCS_2$ of second UE 1100, receive beam 1112 may be the −45° beam with respect to $LCS_1$ of first UE 1110, and receive beam 1111 may be the 0° beam with respect to $LCS_1$ of first UE 1110. Next, first UE 1110 identifies the LoS receive beam as being receive beam 1112 or the −45° beam with respect to LCS1 of first UE 1110. Also, and based on the alignment information received from second UE 1100, first UE 1110 identifies the LoS transmit beam as being transmit beam 1103 or the 90° beam with respect to $LCS_2$ of second UE 1100. First UE 1110 then rotates $LCS_1$ by 45° counterclockwise (see dashed arrow in FIG. 11 for $LCS_1$) such as the LoS receive beam 1112 now corresponds to the −90° beam in the rotated $LCS_1$ of first UE 1110 (i.e. 90° for transmit beam 1103+180° to account for the anti-alignment of the LoS receive beam with the LoS transmit beam=−90°). Although the LCSs and respective beams have been depicted in 2D in FIG. 11, for instance in the azimuth plane, a similar LCS alignment process may take place for both the azimuth and zenith planes in 3D. In this way, $LCS_1$ of first UE 1110 is aligned with $LCS_2$ of second UE 1100, and both UEs achieve angular domain synchronization without the need for an additional compass circuitry.

Whilst in the above discussion various pieces of information have been described, by way of example, as included in the alignment information received at the first UE, it will of course be appreciated that various information may be pre-stored at the first UE. For instance, one or more orientations of transmit beams of the second UE with respect to the LCS of the second UE may be pre-stored at the first UE. Similarly, there may exist a predefined or implicit correspondence between the indices of the transmit beams of the second UE and their respective angles. In some examples, the alignment information received at the first UE from the second UE may be indicative of beam identifiers/signal characteristics corresponding to the pre-stored orientations. In some such examples, this information may comprise a table or function mapping second UE transmit beam orientations with respect to $LCS_2$ to beam identifiers.

By performing alignment as described, in particular by orienting the LCS of the first UE 1110, the LCS of the first UE and the LCS of the second UE share a consistent local angular representation for use in reporting angle measurements.

In some examples, prior to (or after) orienting $LCS_1$ to correspond in orientation to $LCS_2$, supporting UE 1110 may transmit to second UE 1100 a signal including information indicative of a confirmation that first UE 1110 is capable of performing the orientation.

Figure 13:
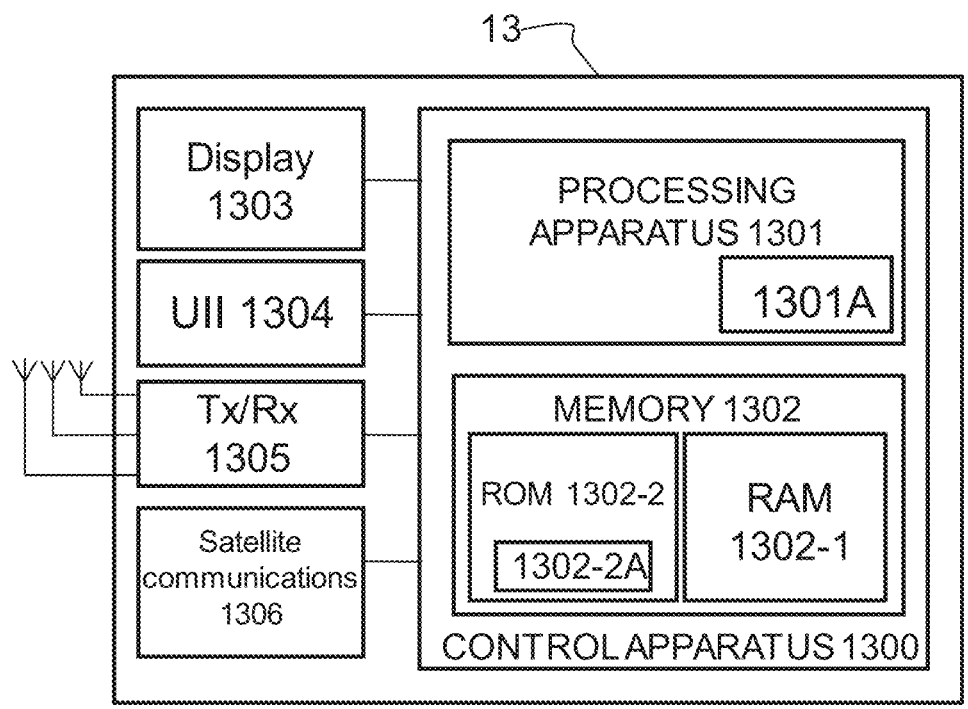
FIG. 13 is a schematic illustration of an example configuration of a UE device which may be configured to perform various operations described with reference to FIGS. 1 to 12.

FIG. 13 is a schematic illustration of an example configuration of a computing apparatus 13 which may be configured to perform various operations described with reference to FIGS. 1 to 12.

Computing apparatus may comprise control apparatus 1300 which is configured to control operation of other components which form part of the computing apparatus 13 thereby to enable performance of various operations described with reference to FIGS. 1 to 12. The computing apparatus 1300 may comprise processing apparatus 1301 and memory 1302. Computer-readable code 1302-2A may be stored on the memory 1302, which when executed by the processing apparatus 1301, causes the control apparatus 1300 to perform any of the operations described herein (e.g. but not limited to those operations attributed to UEs)

In addition, computing apparatus may further include a display 1303, user interactive interface (UII) 1304, radio frequency interface 1305 and global navigation satellite system (GNSS) 1306. In some examples, other satellite communications systems may be used instead of or in addition to GNSS 1306.

Some further details of components and features of the above-described device/entity/apparatus 13 and alternatives for it will now be described.

The control apparatus 1300 described above may comprise processing apparatus 1301 communicatively coupled with memory 1302. The memory 1302 has computer readable instructions 1302-2A stored thereon, which when executed by the processing apparatus 1301 causes the control apparatus 1300 to cause performance of various ones of the operations described with reference to FIGS. 1 to 12. The control apparatus 1300 may in some instance be referred to, in general terms, as "apparatus".

The processing apparatus 1301 may be of any suitable composition and may include one or more processors 1301A of any suitable type or suitable combination of types. Indeed, the term "processing apparatus" should be understood to encompass computers having differing architectures such as single/multi-processor architectures and sequencers/ parallel architectures. For example, the processing apparatus 1301 may be a programmable processor that interprets computer program instructions 1302-2A and processes data. The processing apparatus 1301 may include plural programmable processors. Alternatively, the processing apparatus 1301 may be, for example, programmable hardware with embedded firmware. The processing apparatus 1301 may alternatively or additionally include one or more specialised circuit such as field programmable gate arrays FPGA, Application Specific Integrated Circuits (ASICs), signal processing devices etc. In some instances, processing apparatus 1301 may be referred to as computing apparatus or processing means.

The processing apparatus 1301 is coupled to the memory 1302 and is operable to read/write data to/from the memory 1302. The memory 1302 may comprise a single memory unit or a plurality of memory units, upon which the computer readable instructions (or code) 1302-2A is stored. For example, the memory 1302 may comprise both volatile memory 1302-1 and non-volatile memory 1302-2. In such examples, the computer readable instructions/program code 1302-2A may be stored in the non-volatile memory 1302-2 and may be executed by the processing apparatus 1301 using the volatile memory 1302-1 for temporary storage of data or data and instructions. Examples of volatile memory include random-access memory (RAM), dynamic random-access memory (DRAM), and synchronous dynamic random-access memory (SDRAM) etc. Examples of non-volatile memory include read-only memory (ROM), programmable read-only memory (PROM), electronically erasable programmable read-only memory (EEPROM), flash memory, optical storage, magnetic storage, etc.

The memory 1302 may be referred to as one or more non-transitory computer readable memory medium or one or more storage devices. Further, the term 'memory', in addition to covering memory comprising both one or more non-volatile memory and one or more volatile memory, may also cover one or more volatile memories only, one or more non-volatile memories only. In the context of this document, a "memory" or "computer-readable medium" may be any media or means that can contain, store, communicate, propagate or transport the instructions for use by or in connection with an instruction execution system, apparatus, or device, such as a computer.

Figure 14:
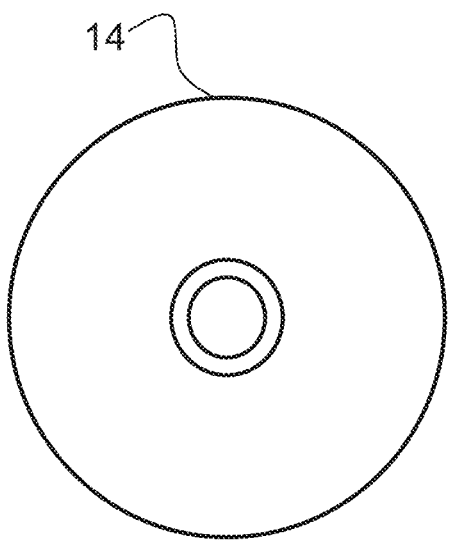
FIG. 14 is an illustration of a computer-readable medium upon which computer readable code may be stored.

The computer readable instructions/program code 1302-2A may be pre-programmed into the control apparatus 1300. Alternatively, the computer readable instructions 1302-2A may arrive at the control apparatus via an electromagnetic carrier signal or may be copied from a physical entity 14 such as a computer program product, a memory device or a record medium such as a compact disc read-only memory (CD-ROM) or digital versatile disc (DVD) an example of which is illustrated in FIG. 14. The computer readable instructions 1302-2A may provide the logic and routines that enables the entity/device/apparatus 13 to perform the functionality described above. The combination of computer-readable instructions stored on memory (of any of the types described above) may be referred to as a computer program product. In general, references to computer program, instructions, code etc. should be understood to express software for a programmable processor firmware such as the programmable content of a hardware device as instructions for a processor or configured or configuration settings for a fixed function device, gate array, programmable logic device, etc.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 3 to 7, 10 and 12 are examples only and that various operations depicted therein may be omitted, reordered and/ or combined.

Although the methods and apparatuses have been described in connection with an E-UTRA network, it will be appreciated that they are not limited to such networks and are applicable to radio networks of various different types.

Although various aspects of the methods and apparatuses described herein are set out in the independent claims, other aspects may comprise other combinations of features from the described embodiments and/or the dependent claims with the features of the independent claims, and not solely the combinations explicitly set out in the claims.

It is also noted herein that while various examples are described above, these descriptions should not be viewed in a limiting sense. Rather, there are several variations and modifications which may be made without departing from the scope of the present invention as defined in the appended claims.

The invention claimed is:

1. An apparatus comprising at least one processor and at least one memory storing instructions that, when executed by the at least one processor, cause the apparatus at least to perform:
   receiving, at a target user equipment, UE, a signal including information indicative of supporting UE measurements of signals transmitted from the target UE to a supporting UE via a multipath communications channel, the supporting UE measurements including delay and angle measurements of the signals transmitted from the target UE to the supporting UE via the multipath communications channel;

time-aligning the supporting UE measurements with target UE measurements of signals transmitted from the supporting UE to the target UE via the multipath communications channel, the target UE measurements including delay and angle measurements for the signals transmitted from the supporting UE to the target UE via the multipath communications channel;

determining, based on the time-aligned measurements, an association between a component of the target UE measurements and at least one respective component of the supporting UE measurements, wherein the associated components are determined to correspond to a particular reflector in an environment of the target UE; and determining, based on the associated components, location information for the particular reflector.

2. The apparatus of claim 1, wherein time-aligning the supporting UE measurements with the target UE measurements comprises determining a common delay-domain origin based on an Rx-Tx time difference of the target UE, an Rx-Tx time difference of the supporting UE, a shortest delay of the supporting UE measurements and a shortest delay of the target UE measurements.

3. The apparatus of claim 1, wherein the supporting UE measurements further include power measurements of the signals transmitted from the target UE to the supporting UE via the multipath communications channel, and wherein the target UE measurements further include power measurements for the signals transmitted from the supporting UE to the target UE via the multipath communications channel.

4. The apparatus of claim 3, wherein the target UE measurements and/or the supporting UE measurements are resampled in the delay domain such that the target UE measurements and the supporting UE measurements have a common delay resolution, and wherein the association is determined based on the resampled measurements.

5. The apparatus of claim 4, wherein the target UE power measurements and the supporting UE power measurements are pruned and/or normalised prior to the resampling.

6. The apparatus of claim 4, wherein the resampling is based on a target channel response generated based on the target UE measurements and/or a supporting channel response generated based on the supporting UE measurements.

7. The apparatus of claim 6, wherein the resampling comprises convolving the target channel response and/or the supporting channel response with a filter having the common delay resolution.

8. The apparatus of claim 6, wherein the resampling comprises applying, to the target channel response and/or the supporting channel response, a discrete Fourier transform, DFT, followed by an inverse discrete Fourier transform, IDFT, wherein the IDFT has the common delay resolution.

9. The apparatus of claim 1, wherein the at least one respective component of the supporting UE measurements is determined to be associated with the component of the target UE measurements based on a minimisation of a divergence metric between the component of the target UE measurements and the at least one respective component of the supporting UE measurements.

10. The apparatus of claim 1, wherein the at least one memory stores instructions that, when executed by the at least one processor, cause the apparatus at least to perform:
aligning a coordinate system of the target UE with a coordinate system of the supporting UE based on a common reference direction.

11. The apparatus of claim 1, wherein the at least one respective component of the supporting UE measurements is determined to be associated with the component of the target UE measurements based on either:
a delay measurement of the at least one respective component of the supporting UE measurements being within a threshold delay of a delay measurement of the component of the target UE measurements; and/or
a power measurement of the at least one respective component of the supporting UE measurements being within a threshold power of a power measurement of the component of the target UE measurements.

12. The apparatus of claim 1, wherein the location information for the particular reflector includes at least one of:
a distance and/or angle from the target UE to the particular reflector;
a distance and/or angle from the supporting UE to the particular reflector;
a distance and/or angle from a neighbouring UE to the particular reflector;
a position of the particular reflector with respect to a local coordinate system, LCS, of the target UE, the supporting UE, and/or a neighbouring UE; and
a position of the particular reflector with respect to a global coordinate system, GCS.

13. The apparatus of claim 1,
wherein the at least one memory stores instructions that, when executed by the at least one processor, cause the apparatus at least to perform:
receiving, at a target user equipment, UE, a signal including information indicative of additional supporting UE measurements of signals transmitted from the target UE to an additional supporting UE via an additional multipath communications channel, the additional supporting UE measurements including delay and angle measurements of the signals transmitted from the target UE to the additional supporting UE via the additional multipath communications channel;
time-aligning the additional supporting UE measurements with additional target UE measurements of signals transmitted from the additional supporting UE to the target UE via the additional multipath communications channel, the additional target UE measurements including delay and angle measurements for the signals transmitted from the additional supporting UE to the target UE via the additional multipath communications channel; and
determining, based on the additional time-aligned measurements, an additional association between a component of the additional target UE measurements and at least one respective component of the additional supporting UE measurements, wherein the additionally associated components are determined to correspond to the particular reflector,
wherein the determination of the location information for the particular reflector is further based on the additionally associated components.

14. An apparatus according to claim 1, wherein the location information for the particular reflector is determined based on an average of location information determined based on the associated components and location information determined based on the additionally associated components.

15. A user equipment device apparatus including an apparatus comprising at least one processor and at least one memory storing instructions that, when executed by the at least one processor, cause the apparatus at least to perform:

receiving, at a target user equipment, UE, a signal including information indicative of supporting UE measurements of signals transmitted from the target UE to a supporting UE via a multipath communications channel, the supporting UE measurements including delay and angle measurements of the signals transmitted from the target UE to the supporting UE via the multipath communications channel;

time-aligning the supporting UE measurements with target UE measurements of signals transmitted from the supporting UE to the target UE via the multipath communications channel, the target UE measurements including delay and angle measurements for the signals transmitted from the supporting UE to the target UE via the multipath communications channel;

determining, based on the time-aligned measurements, an association between a component of the target UE measurements and at least one respective component of the supporting UE measurements, wherein the associated components are determined to correspond to a particular reflector in an environment of the target UE; and determining, based on the associated components, location information for the particular reflector.

16. A method comprising:

receiving, at a target user equipment, UE, a signal including information indicative of supporting UE measurements of signals transmitted from the target UE to a supporting UE via a multipath communications channel, the supporting UE measurements including delay and angle measurements of the signals transmitted from the target UE to the supporting UE via the multipath communications channel;

time-aligning the supporting UE measurements with target UE measurements of signals transmitted from the supporting UE to the target UE via the multipath communications channel, the target UE measurements including delay and angle measurements for the signals transmitted from the supporting UE to the target UE via the multipath communications channel;

determining, based on the time-aligned measurements, an association between a component of the target UE measurements and at least one respective component of the supporting UE measurements, wherein the associated components are determined to correspond to a particular reflector in an environment of the target UE; and determining, based on the associated components, location information for the particular reflector.

17. The method of claim 16, wherein time-aligning the supporting UE measurements with the target UE measurements comprises determining a common delay-domain origin based on an Rx-Tx time difference of the target UE, an Rx-Tx time difference of the supporting UE, a shortest delay of the supporting UE measurements and a shortest delay of the target UE measurements.

18. The apparatus of claim 1, wherein the at least one memory stores instructions that, when executed by the at least one processor, cause the apparatus at least to perform determining a position of the particular reflector relative to the target UE based on the determined location information.

19. An apparatus according to claim 14, wherein the average is weighted based on confidence estimates received at the target UE from the supporting UE and the additional supporting UE.

20. An apparatus according to claim 1, wherein the location information for the particular reflector is determined using a joint optimisation process.

* * * * *